(12) United States Patent
Miyamoto et al.

(10) Patent No.: US 11,993,915 B2
(45) Date of Patent: May 28, 2024

(54) OPERATOR'S CAB AND WORK VEHICLE

(71) Applicant: KOMATSU LTD., Tokyo (JP)

(72) Inventors: Hideaki Miyamoto, Tokyo (JP);
Makoto Sasaki, Tokyo (JP); Hiroaki Tanaka, Tokyo (JP); Norihiro Iwahashi, Tokyo (JP)

(73) Assignee: KOMATSU LTD., Tokyo (JP)

( * ) Notice: Subject to any disclaimer, the term of this patent is extended or adjusted under 35 U.S.C. 154(b) by 220 days.

(21) Appl. No.: 17/310,916

(22) PCT Filed: Feb. 26, 2020

(86) PCT No.: PCT/JP2020/007636
§ 371 (c)(1),
(2) Date: Aug. 31, 2021

(87) PCT Pub. No.: WO2020/179566
PCT Pub. Date: Sep. 10, 2020

(65) Prior Publication Data
US 2022/0136209 A1    May 5, 2022

(30) Foreign Application Priority Data

Mar. 1, 2019  (JP) ................................ 2019-037958

(51) Int. Cl.
*B60N 2/75* (2018.01)
*E02F 9/16* (2006.01)
*E02F 9/20* (2006.01)

(52) U.S. Cl.
CPC ............... *E02F 9/166* (2013.01); *B60N 2/75* (2018.02); *E02F 9/2004* (2013.01)

(58) Field of Classification Search
CPC .................................. B60N 2/75; B60N 2/38
See application file for complete search history.

(56) References Cited

U.S. PATENT DOCUMENTS

| | | | |
|---|---|---|---|
| H1831 H | 2/2000 | Kelley et al. | |
| 6,202,501 B1 | 3/2001 | Ikari | |
| 6,631,652 B1 | 10/2003 | Okazawa et al. | |
| 8,714,049 B2 | 5/2014 | Ast et al. | |
| 9,986,841 B2 * | 6/2018 | McMillan | A47C 11/005 |
| 2008/0023250 A1 | 1/2008 | Hefner et al. | |

(Continued)

FOREIGN PATENT DOCUMENTS

| | | | | |
|---|---|---|---|---|
| AU | 2020270148 A1 | * | 12/2021 | B60G 13/001 |
| CN | 101289068 A | | 10/2008 | |

(Continued)

*Primary Examiner* — Timothy J Brindley
(74) *Attorney, Agent, or Firm* — Faegre Drinker Biddle & Reath LLP

(57) ABSTRACT

An operator's cab includes an operator's seat provided on a floor surface, a control lever that is provided laterally to the operator's seat and is operated at least toward the operator's seat, and an armrest that includes an upper surface and is provided laterally to the operator's seat in the rear of the control lever. A front portion of the upper surface is larger in width than a rear portion of the upper surface. The front portion of the upper surface includes an inclined portion. With the floor surface being defined as the reference, the inclined portion decreases in height toward the operator's seat.

8 Claims, 19 Drawing Sheets

(56) References Cited

U.S. PATENT DOCUMENTS

| | | | | |
|---|---|---|---|---|
| 2010/0052356 A1* | 3/2010 | Lewis, II | ............... | B60N 2/501 |
| | | | | 297/219.1 |
| 2016/0355111 A1 | 12/2016 | Randleman et al. | | |
| 2017/0325287 A1* | 11/2017 | Ji | ........................ | H05B 1/0236 |
| 2018/0105272 A1* | 4/2018 | Scott | .................. | B64D 11/0646 |
| 2020/0022303 A1* | 1/2020 | Gindt | ................... | A01D 34/824 |
| 2021/0284019 A1* | 9/2021 | Koshiol | .................... | E02F 9/16 |

FOREIGN PATENT DOCUMENTS

| | | | | |
|---|---|---|---|---|
| CN | 203158094 U | 8/2013 | | |
| CN | 205890605 U | 1/2017 | | |
| GB | 796613 A * | 6/1958 | | |
| JP | H10-252100 A | 9/1998 | | |
| JP | H11-296246 A | 10/1999 | | |
| JP | H11-321664 A | 11/1999 | | |
| JP | 2000-148273 A | 5/2000 | | |
| JP | 2007-153016 A | 6/2007 | | |
| JP | 2010-262562 A | 11/2010 | | |
| JP | 2015-096421 A | 5/2015 | | |
| KR | 102509694 B1 * | 3/2023 | | |
| WO | WO-81/00541 A1 | 3/1981 | | |
| WO | WO-2021080628 A1 * | 4/2021 | ............... | B60N 2/75 |
| WO | WO-2023013327 A1 * | 2/2023 | | |

\* cited by examiner

OPERATOR'S CAB AND WORK VEHICLE

TECHNICAL FIELD

The present disclosure relates to an operator's cab and a work vehicle.

BACKGROUND ART

For example, Japanese Patent Laying-Open No. 2007-153016 (PTL 1) discloses a wheel loader including an operator's seat, a right console box arranged on the right of the operator's seat, and an armrest and a work implement lever provided in the right console box.

CITATION LIST

Patent Literature

PTL 1: Japanese Patent Laying-Open No. 2007-153016

SUMMARY OF INVENTION

Technical Problem

In the wheel loader disclosed in PTL 1 described above, an operator sits in the operator's seat and operates the work implement lever with his/her arm (the forearm from the elbow to the wrist) being placed on the armrest. A position and an inclination of the operator's arm variously change as the operator operates the work implement lever. Therefore, movement of the operator's arm in operating the work implement lever is interfered by the armrest and the operator may not be able to smoothly operate the work implement lever.

Then, an object of the present disclosure is to provide an operator's cab and a work vehicle that allow a smooth operation onto an operation portion.

Solution to Problem

An operator's cab according to the present disclosure includes an operator's seat, an operation portion, and an armrest. The operator's seat is provided on a floor surface. The operation portion is provided laterally to the operator's seat. The operation portion is operated at least toward the operator' seat. The armrest includes an upper surface. The armrest is provided laterally to the operator's seat in the rear of the operation portion. A front portion of the upper surface is larger in width than a rear portion of the upper surface. The front portion of the upper surface includes an inclined portion. With the floor surface being defined as the reference, the inclined portion decreases in height toward the operator's seat.

The work vehicle according to the present disclosure includes the operator's cab described above and a work implement controlled by using the operation portion.

Advantageous Effects of Invention

According to the present disclosure, the operator's cab and the work vehicle that allow a smooth operation onto the operation portion can be provided.

DESCRIPTION OF EMBODIMENTS

Figure 1:
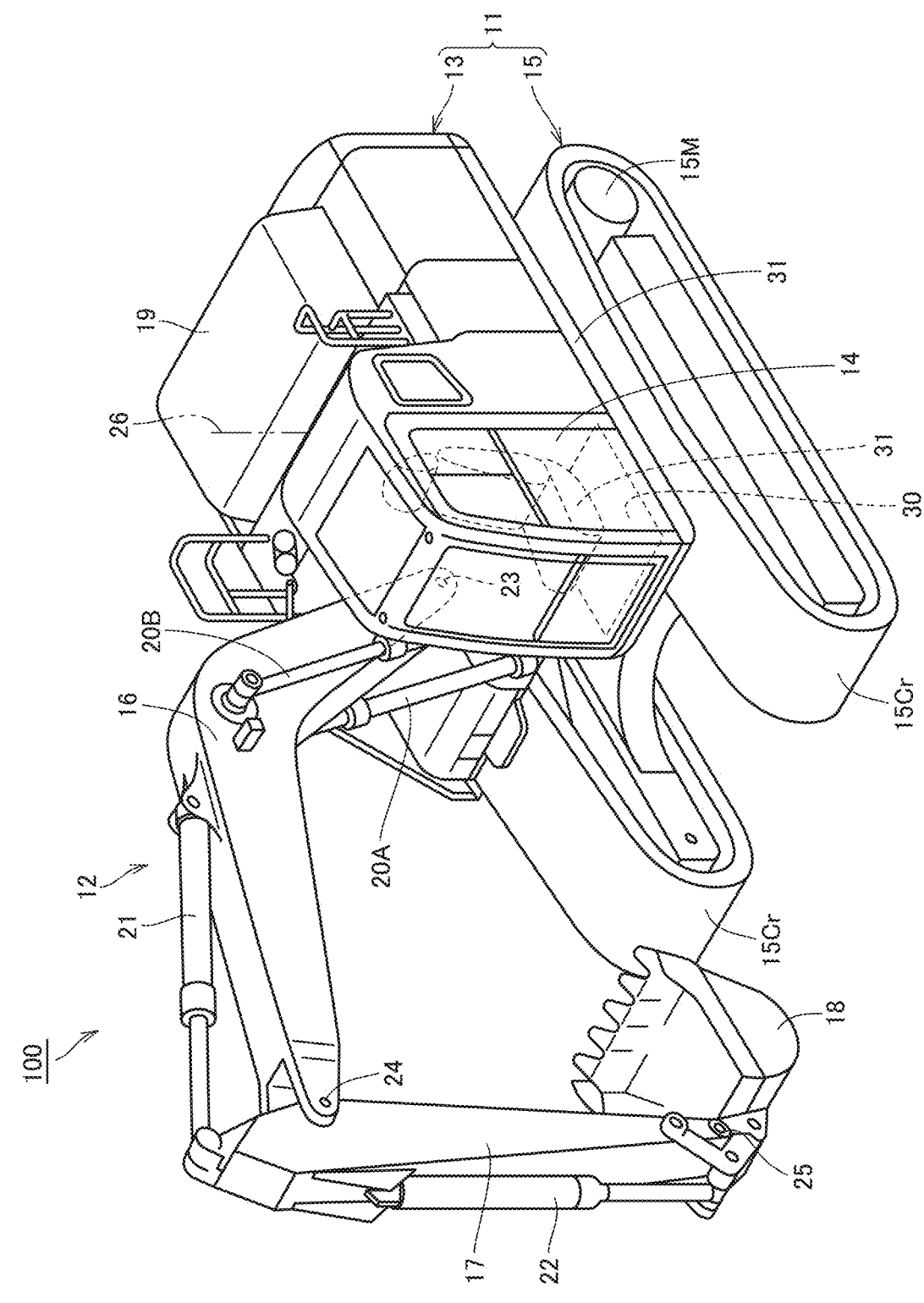
FIG. 1 is a perspective view showing a hydraulic excavator in an embodiment of the present disclosure.

An embodiment of the present disclosure will be described with reference to the drawings. The same or corresponding members in the drawings referred to below have the same reference characters allotted.

[Description of Overall Structure of Hydraulic Excavator]

FIG. 1 is a perspective view showing a hydraulic excavator in an embodiment of the present disclosure. An overall structure of the hydraulic excavator in the present embodiment will initially be described.

As shown in FIG. 1, a hydraulic excavator 100 includes a vehicular main body 11 and a work implement 12. Vehicular main body 11 includes a revolving unit 13 and a traveling apparatus 15.

Traveling apparatus 15 includes a pair of crawler belts 15Cr and a travel motor 15M. Hydraulic excavator 100 can travel as crawler belts 15Cr rotate. Travel motor 15M is provided as a drive source of traveling apparatus 15. Traveling apparatus 15 may include wheels (tires).

Revolving unit 13 is provided on traveling apparatus 15. Revolving unit 13 can revolve around a revolution center 26 with respect to traveling apparatus 15. Revolution center 26 refers to an axis extending in an upward/downward direction. Revolving unit 13 includes an operator's cab (cab) 14. Operator's cab 14 defines an indoor space where an operator gets in. An operator's seat 31 is provided in operator's cab 14. Operator's seat 31 is provided on a floor surface 30 of operator's cab 14. The operator sits in operator's seat 31 and operates hydraulic excavator 100.

The present disclosure is applicable also to an operator's cab of a work vehicle of such a type that the operator's seat is provided in an external space.

Revolving unit 13 includes an engine hood 19 and a counterweight provided in the rear of revolving unit 13. An engine, a hydraulic oil tank, an air cleaner, a hydraulic pump, and the like are accommodated in engine hood 19.

Work implement 12 is attached to vehicular main body 11. Work implement 12 is attached to revolving unit 13. Work implement 12 performs such works as excavation of the ground. Work implement 12 includes a boom 16, an arm 17, and a bucket 18.

Boom 16 is pivotably coupled to vehicular main body 11 (revolving unit 13) with a boom pin 23 being interposed. Arm 17 is pivotably coupled to boom 16 with an arm pin 24 being interposed. Bucket 18 is pivotably coupled to arm 17 with a bucket pin 25 being interposed.

Work implement 12 further includes a boom cylinder 20A and a boom cylinder 20B, an arm cylinder 21, and a bucket cylinder 22.

Boom cylinder 20A, boom cylinder 20B, arm cylinder 21, and bucket cylinder 22 are hydraulic cylinders driven by hydraulic oil. Boom cylinder 20A and boom cylinder 20B are provided as a pair on respective opposing sides of boom 16, and they pivotally operate boom 16. Arm cylinder 21 pivotally operates arm 17. Bucket cylinder 22 pivotally operates bucket 18.

In the description below, a fore/aft direction refers to a fore/aft direction of an operator who sits in operator's seat 31. A direction in which the operator sitting in operator's seat 31 faces is defined as the fore direction and a direction behind the operator sitting in operator's seat 31 is defined as the aft direction. A lateral (side) direction refers to a lateral direction of the operator who sits in operator's seat 31. A right side and a left side at the time when the operator sitting in operator's seat 31 faces front are defined as the right direction and the left direction, respectively. An upward/downward direction is a direction orthogonal to the plane including the fore/aft direction and the lateral direction. A side where the ground is located is defined as a lower side and a side where the sky is located is defined as an upper side.

Figure 2:
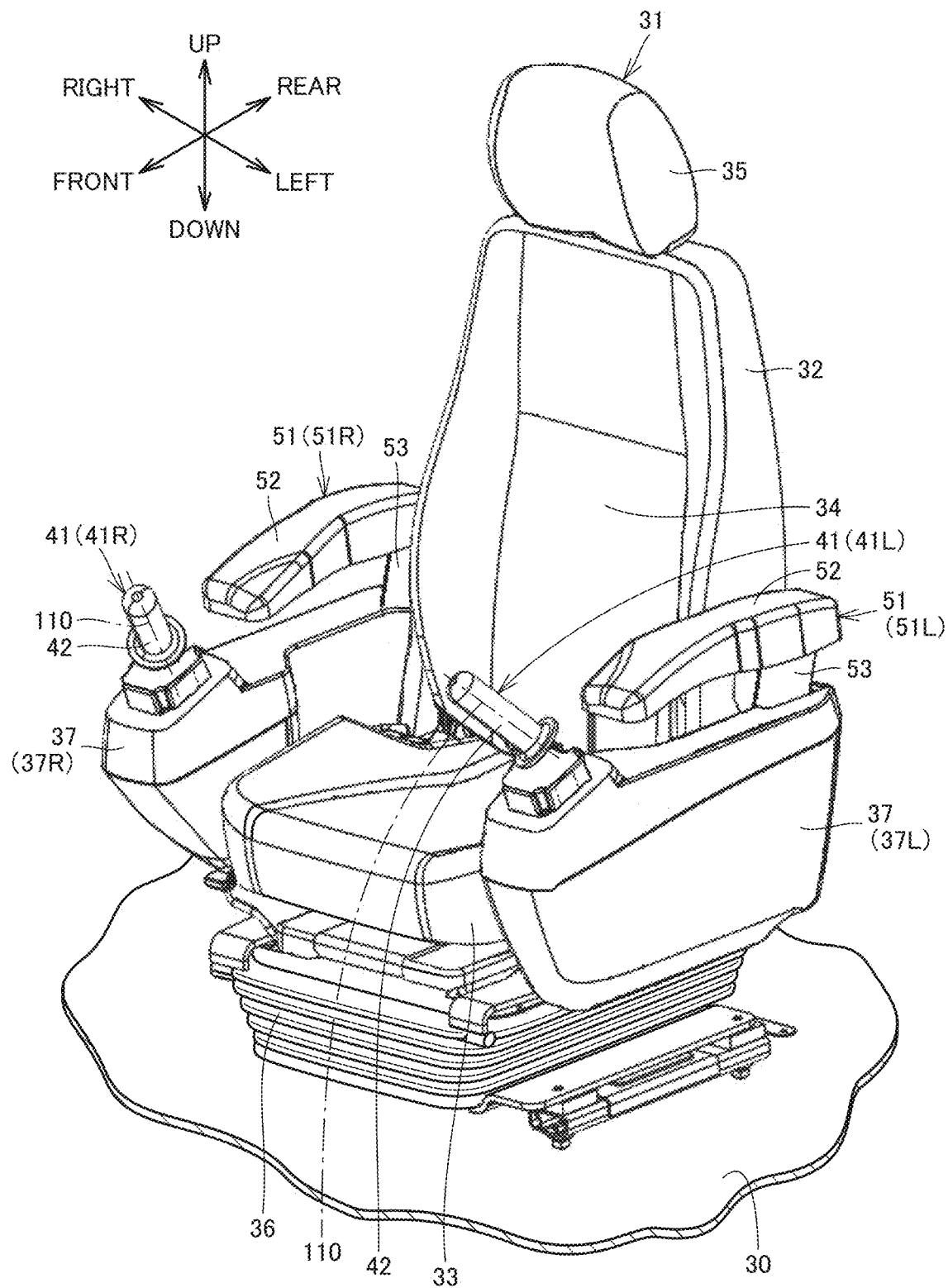
FIG. 2 is a perspective view showing a structure around an operator's seat in an operator's cab in FIG. 1.
Figure 3:
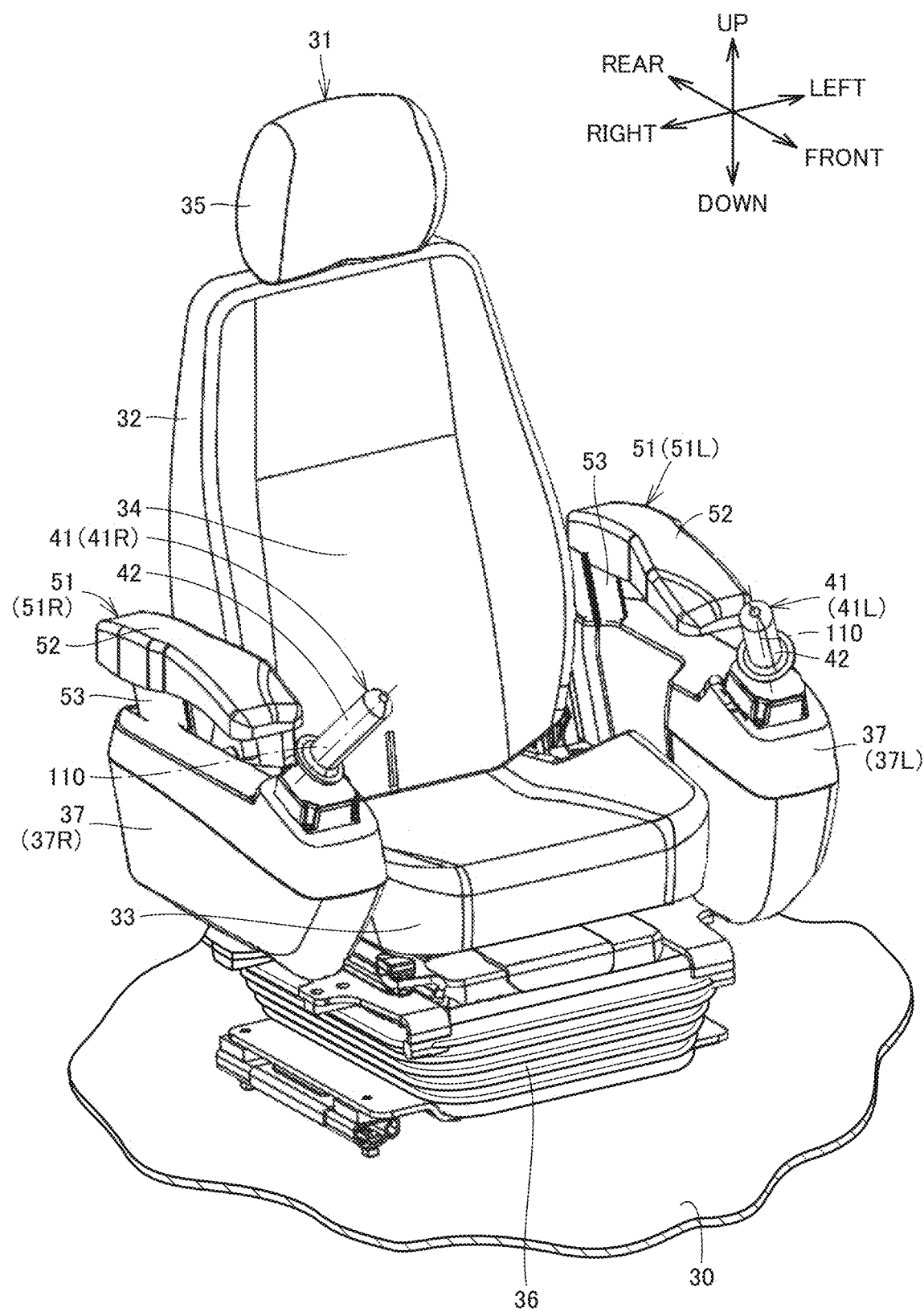
FIG. 3 is another perspective view showing the structure around the operator's seat in the operator's cab in FIG. 1.
Figure 4:
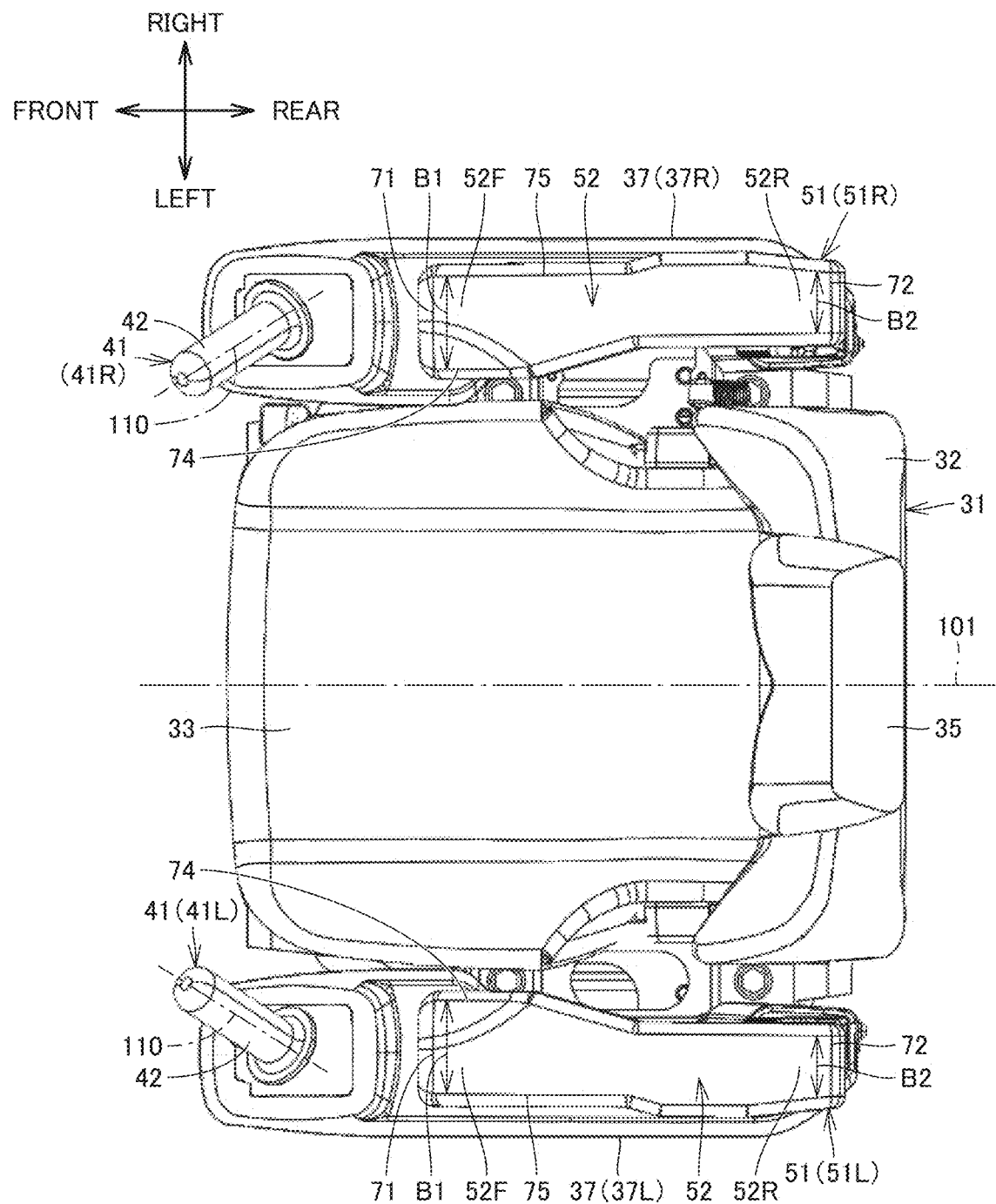
FIG. 4 is a top view showing the structure around the operator's seat in the operator's cab in FIG. 1.
Figure 5:
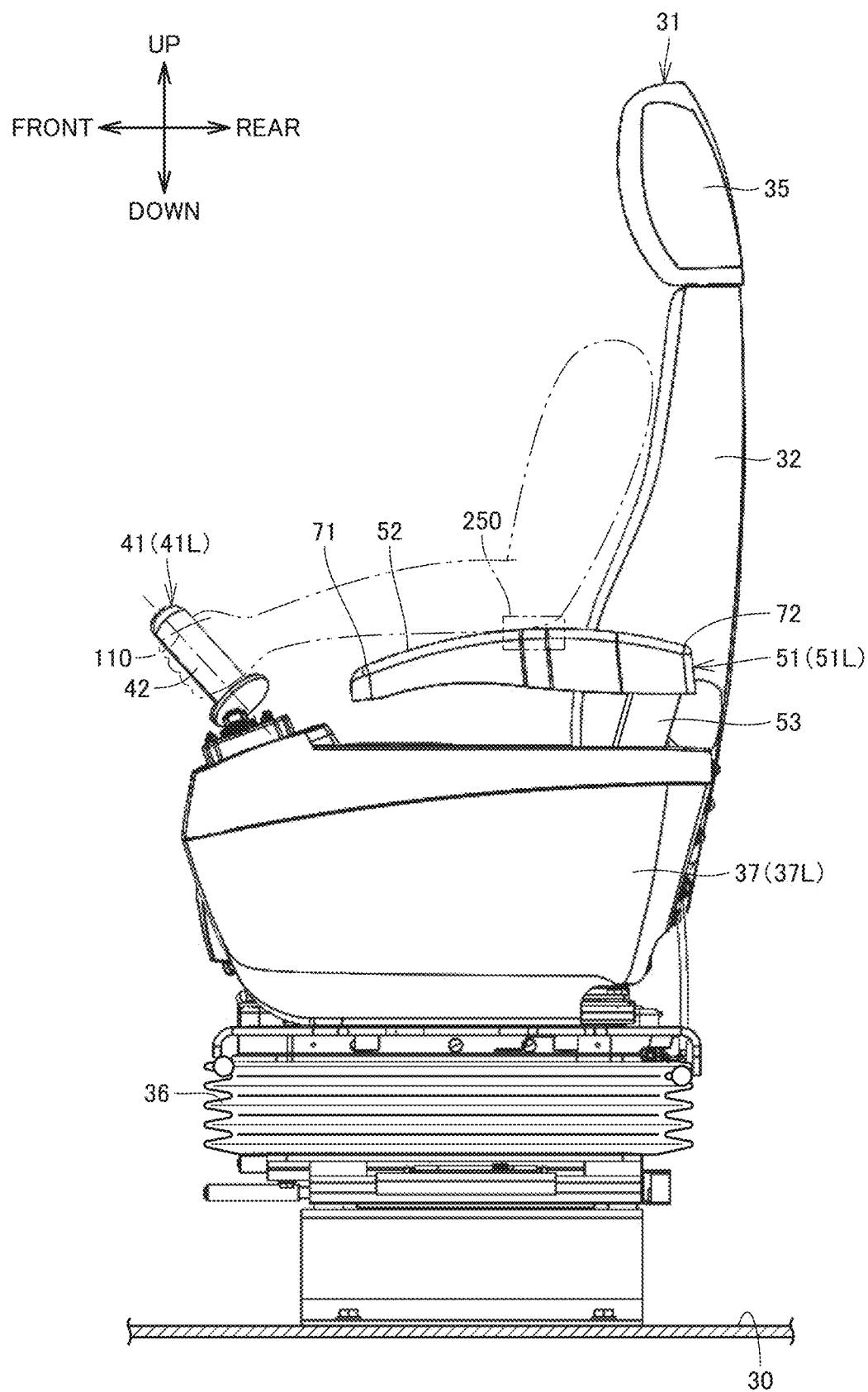
FIG. 5 is a left side view showing the structure around the operator's seat in the operator's cab in FIG. 1.

FIGS. 2 and 3 are perspective views showing a structure around the operator's seat in the operator's cab in FIG. 1. FIG. 4 is a top view showing the structure around the operator's seat in the operator's cab in FIG. 1. FIG. 5 is a left side view showing the structure around the operator's seat in the operator's cab in FIG. 1.

As shown in FIGS. 2 to 5, operator's seat 31 includes a seat cushion 33, a seat back 32, a headrest 35, and a suspension mechanism 36.

Seat cushion 33 is a seat part in which an operator sits down. Seat back 32 is provided to rise upward from a rear end of seat cushion 33. Seat back 32 is a seat part serving as a backrest for an operator. Headrest 35 is attached to an upper end of seat back 32. Headrest 35 is a seat part that supports the operator's head.

Suspension mechanism 36 is provided between seat cushion 33 and floor surface 30 in the upward/downward direction. Suspension mechanism 36 elastically supports seat cushion 33.

Operator's cab 14 includes a console 37 (37R and 37L) and a control lever 41 (41R and 41L). Console 37 is provided laterally to operator's seat 31. Console 37R is provided on the right of operator's seat 31. Console 37L is provided on the left of operator's seat 31.

Console 37R and console 37L are provided in symmetry with respect to operator's seat 31.

Console 37 is in a shape of a housing. Console 37 is in such an elongated shape that the fore/aft direction is defined as a longitudinal direction and the lateral direction is defined as a short-side direction in a top view. Console 37 is provided over a range across seat cushion 33 in the upward/downward direction. Console 37 is provided over a range superimposed on seat cushion 33 and seat back 32 in the fore/aft direction. A space above seat cushion 33 is surrounded on three sides of a right side, a rear side, and a left side by console 37R, seat back 32, and console 37L, and opens forward.

Control lever 41 is provided laterally to operator's seat 31. A control lever 41R is provided on the right of operator's seat 31. A control lever 41L is provided on the left of operator's seat 31.

Control lever 41R and control lever 41L are provided in symmetry with respect to operator's seat 31.

Control lever 41 is attached to console 37. Control lever 41 projects upward from console 37. In the top view, control lever 41 is provided closer to a front end of console 37 than to a rear end of console 37. Control lever 41 is provided in front of seat back 32. Control lever 41 is provided above seat cushion 33.

Control lever 41 includes a grip 42. Grip 42 is constructed to be held by the operator. Grip 42 extends like a shaft around a central axis 110. Grip 42 is in a columnar shape with central axis 110 being defined as the center. Grip 42 is erected such that central axis 110 extends along the upward/downward direction. Control lever 41 can be tilted with a lower end of grip 42 being defined as the center.

Grip 42 is not limited to a grip in the columnar shape as above. For example, the grip may be provided in such a horizontal position that central axis 110 extends horizontally or may be in an arcuately curved shape.

Figure 6:
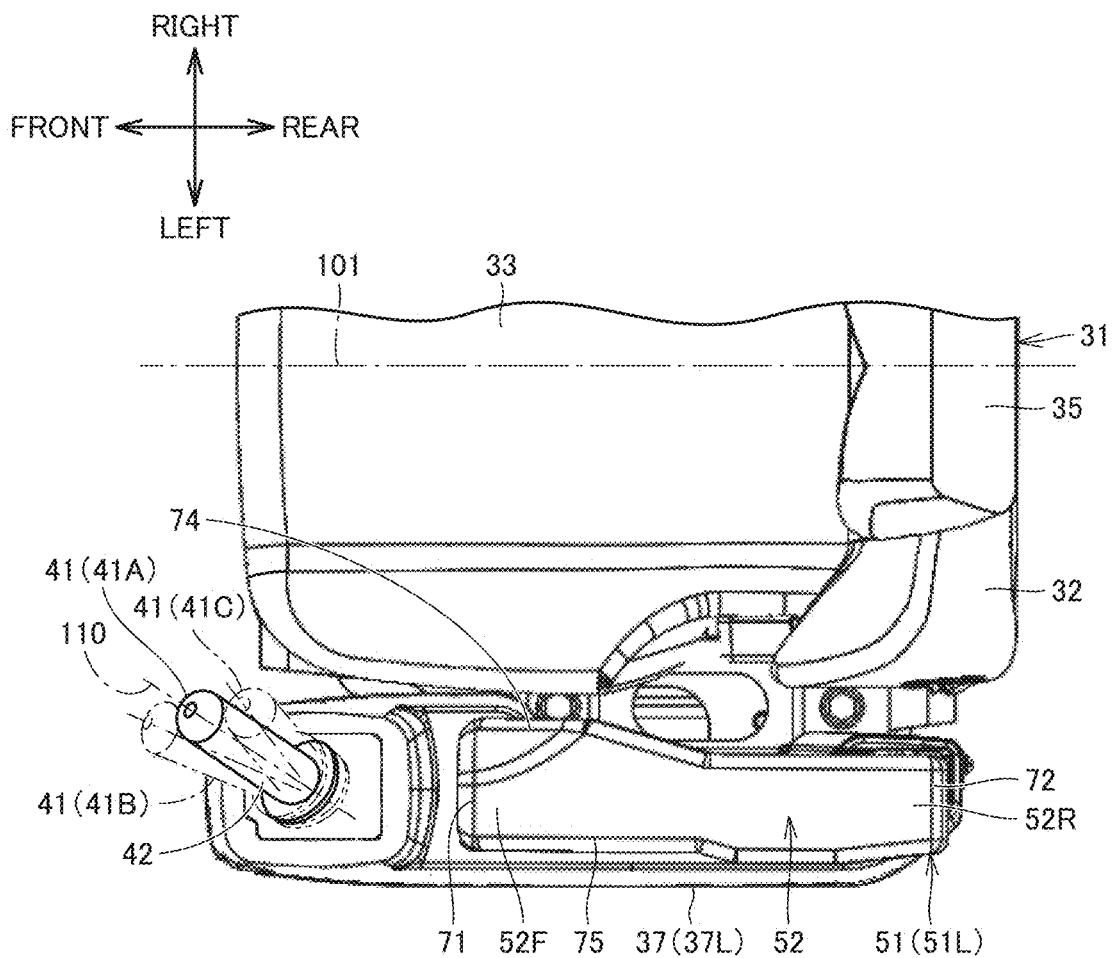
FIG. 6 is a top view showing an operation in a fore/aft direction of a control lever in FIG. 4.
Figure 7:
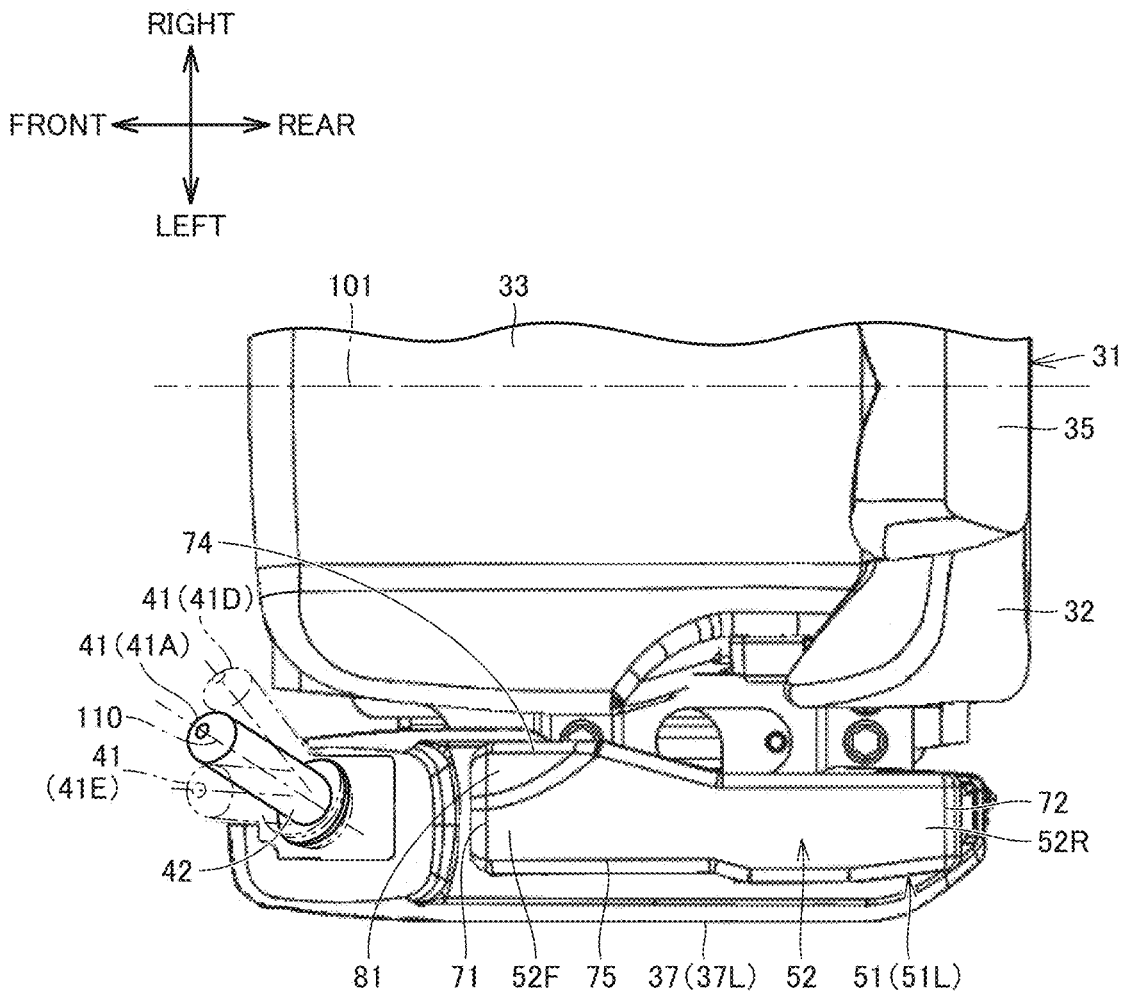
FIG. 7 is a top view showing an operation in a lateral direction of the control lever in FIG. 4.
Figure 8:
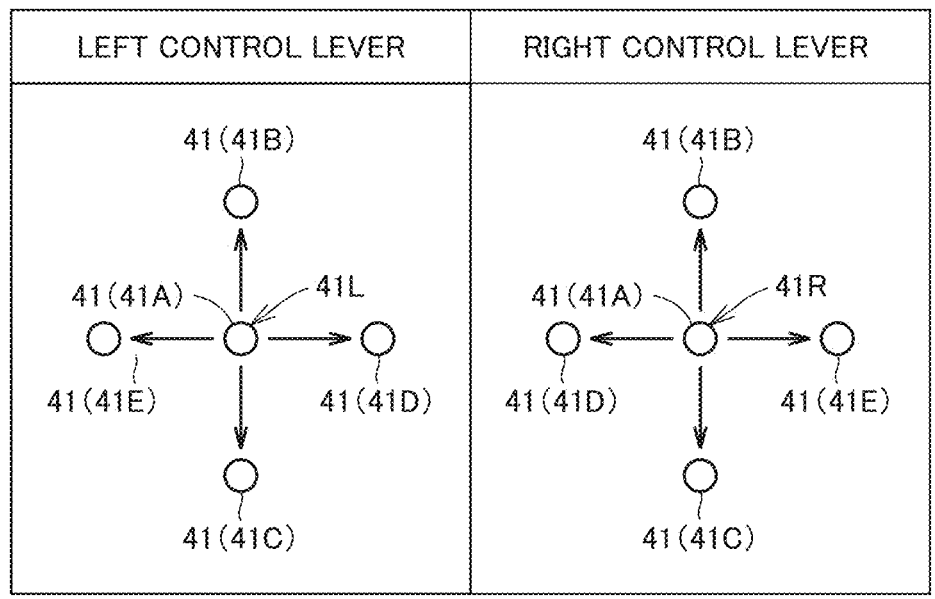
FIG. 8 is a diagram schematically showing an operation of left and right control levers.

FIG. 6 is a top view showing an operation in the fore/aft direction of the control lever in FIG. 4. FIG. 7 is a top view showing an operation in the lateral direction of the control lever in FIG. 4. FIG. 8 is a diagram schematically showing an operation of the left and right control levers.

As shown in FIGS. 6 and 8, control lever 41 is operated at least in the fore/aft direction. Control lever 41 is operated by the operator to control an operation of work implement 12.

Control lever 41 can be tilted between a neutral position (41A: a position shown by a control lever 41A) and a front position (41B: a position shown by a control lever 41B) shifted forward from the neutral position (41A). Control lever 41 can be titled between the neutral position (41A) and a rear position (41C: a position shown by a control lever 41C) shifted rearward from the neutral position (41A).

Control lever 41 activates work implement 12 when it is positioned at the front position (41B) and the rear position (41C). Control lever 41 automatically returns from the front position (41B) and the rear position (41C) to the neutral position (41A), for example, upon receiving elastic force from a spring member (not shown). When control lever 41 is positioned at the neutral position (41A), work implement 12 stops.

By way of example, when left control lever 41L is positioned at the front position (41B), a dumping operation by arm 17 is performed, and when left control lever 41L is positioned at the rear position (41C), an excavation operation by arm 17 is performed. When right control lever 41R is positioned at the front position (41B), an operation to lower boom 16 is performed, and when right control lever 41R is positioned at the rear position (41C), an operation to raise boom 16 is performed.

As shown in FIGS. 7 and 8, control lever 41 is operated at least in a direction toward operator's seat 31. Control lever 41 is operated in the lateral direction. Control lever 41 is operated by the operator to control an operation of work implement 12.

Control lever 41 can be tilted between the neutral position (41A: the position shown by control lever 41A) and an inner position (41D: a position shown by a control lever 41D) shifted in the direction from the neutral position (41A) toward operator's seat 31 along the lateral direction (which is also referred to as "inward along the lateral direction" below). Control lever 41 can be titled between the neutral position (41A) and an outer position (41E: a position shown by a control lever 41E) shifted from the neutral position (41A) in a direction away from operator's seat 31 in the lateral direction (which is also referred to as "outward along the lateral direction" below).

Control lever 41 activates work implement 12 when it is positioned at the inner position (41D) and the outer portion (41E). Control lever 41 automatically returns to the neutral position (41A) from the inner position (41D) and the outer position (41E), for example, upon receiving elastic force from the spring member (not shown). When control lever 41 is positioned at the neutral position (41A), work implement 12 stops.

By way of example, when left control lever 41L is positioned at the inner position (41D), work implement 12 revolves to the right, and when left control lever 41L is positioned at the outer position (41E), work implement 12 revolves to the left. When right control lever 41R is positioned at the inner position (41D), an excavation operation by bucket 18 is performed, and when right control lever 41R is positioned at the outer position (41E), a dumping operation by bucket 18 is performed.

Control lever 41 can be tilted also to a position intermediate between two positions adjacent to each other in a circumferential direction around the neutral position (41A). For example, left control lever 41L can be titled also to a position intermediate between the front position (41B) and the outer position (41E), and in this case, the dumping operation by arm 17 and left revolution of work implement 12 are simultaneously performed.

As shown in FIGS. 2 to 5, operator's cab 14 further includes an armrest 51 (51R and 51L).

Armrest 51 is provided laterally to operator's seat 31. Armrest 51R is provided on the right side of operator's seat 31. Armrest 51L is provided on the left side of operator's seat 31. Armrest 51 is provided in the rear of control lever 41. Armrest 51R is provided in the rear of control lever 41R. Armrest 51L is provided in the rear of control lever 41L.

Armrest 51R and armrest 51L are provided in symmetry with respect to operator's seat 31.

Armrest 51 is attached to console 37 with an armrest support 53 being interposed. Armrest 51 is provided above console 37. In the top view, armrest 51 is provided closer to the rear end of console 37 than to the front end of console 37. Armrest 51 is provided above seat cushion 33. Control lever 41 and armrest 51 are provided above console 37 as being aligned in the fore/aft direction. Armrest 51 is provided at a position distant rearward from control lever 41.

Armrest 51 is used as a support for an operator's elbow. In a representative form, armrest 51 includes a plate material made of a metal that forms a skeleton of armrest 51, a cushion material (a urethane foam or the like) that is elastic and covers the plate material, and a cover that covers a surface of the cushion material.

[Description of Armrest]
(As to Overall Shape of Armrest)

Figure 9:
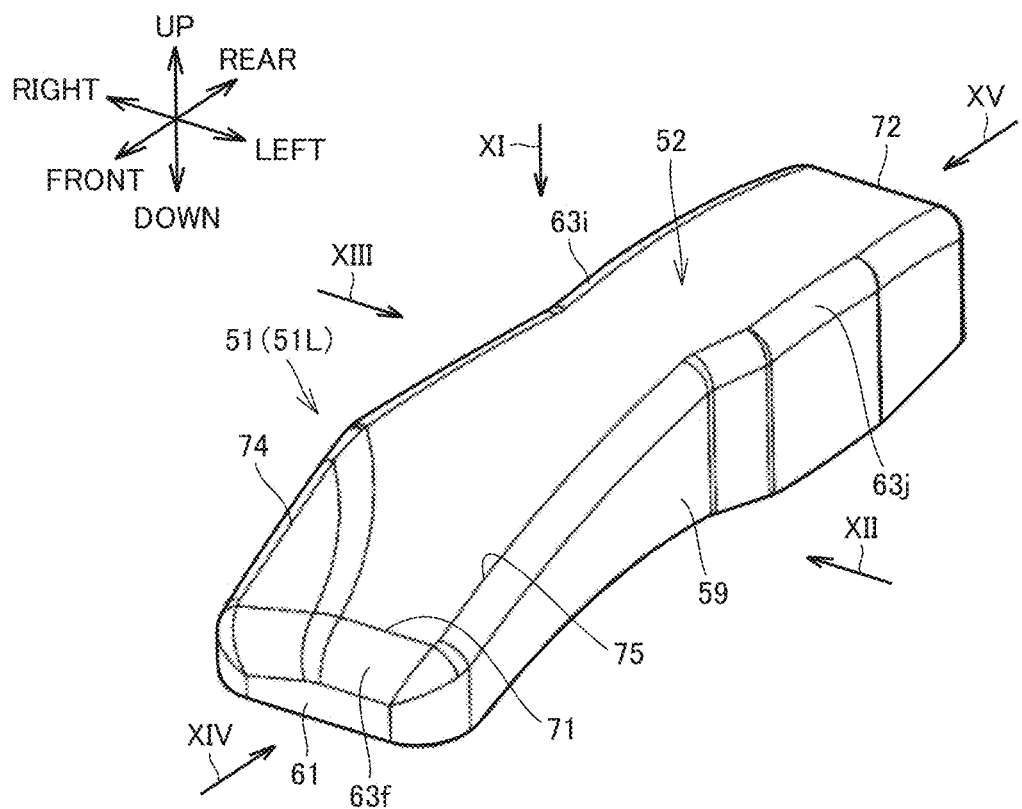
FIG. 9 is a perspective view showing an armrest.
Figure 10:
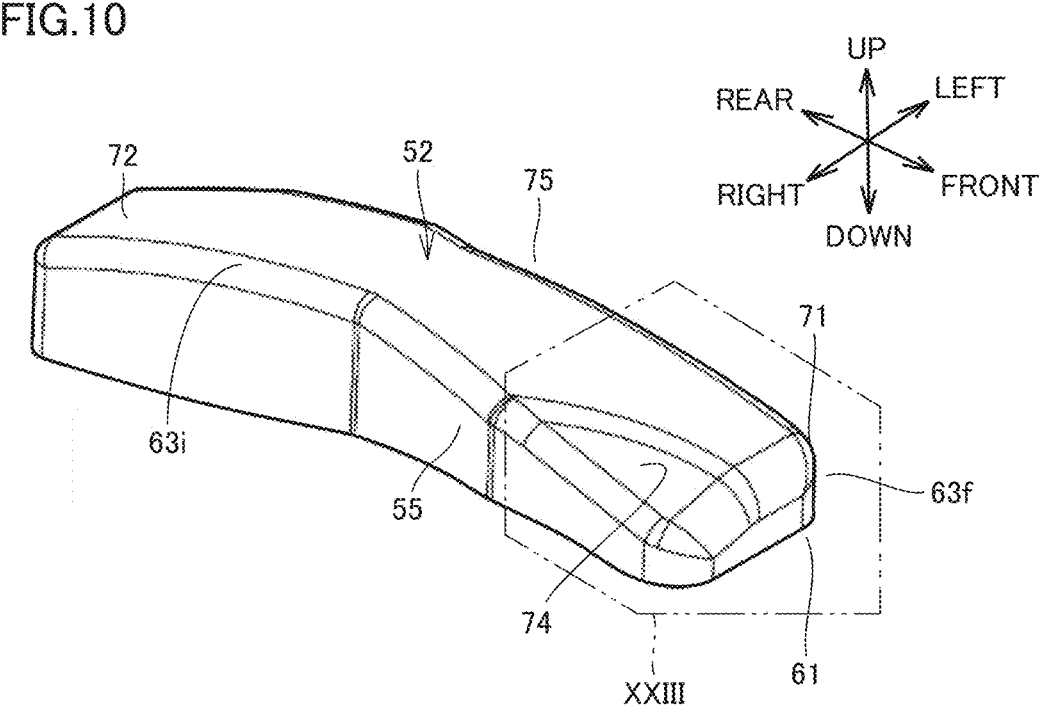
FIG. 10 is another perspective view showing the armrest.
Figure 11:
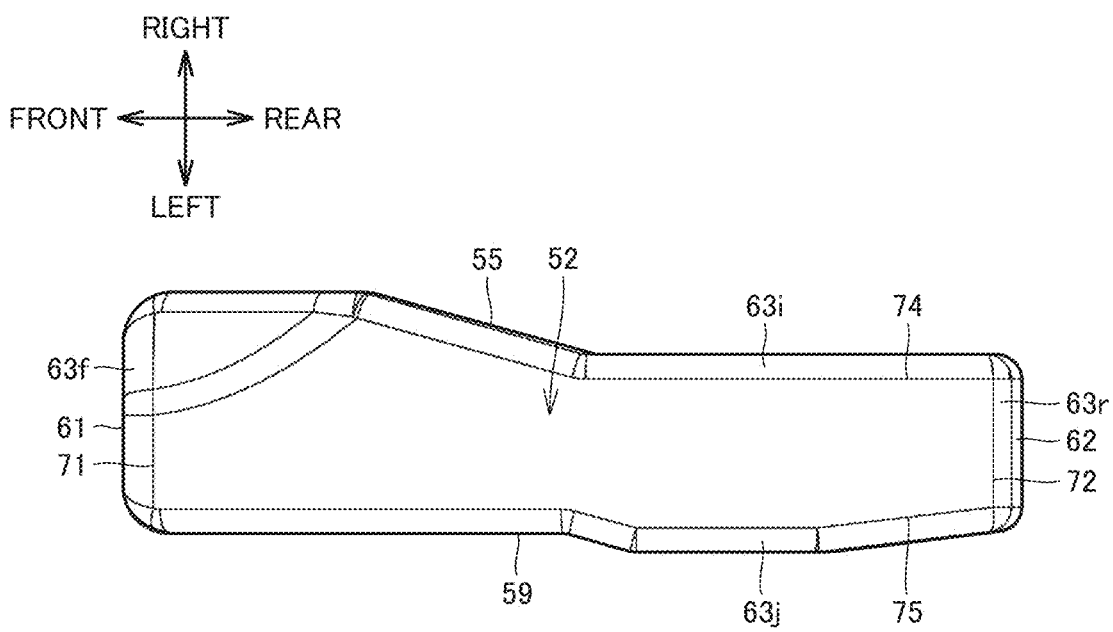
FIG. 11 is a top view showing the armrest in a direction shown with an arrow XI in FIG. 9.
Figure 12:
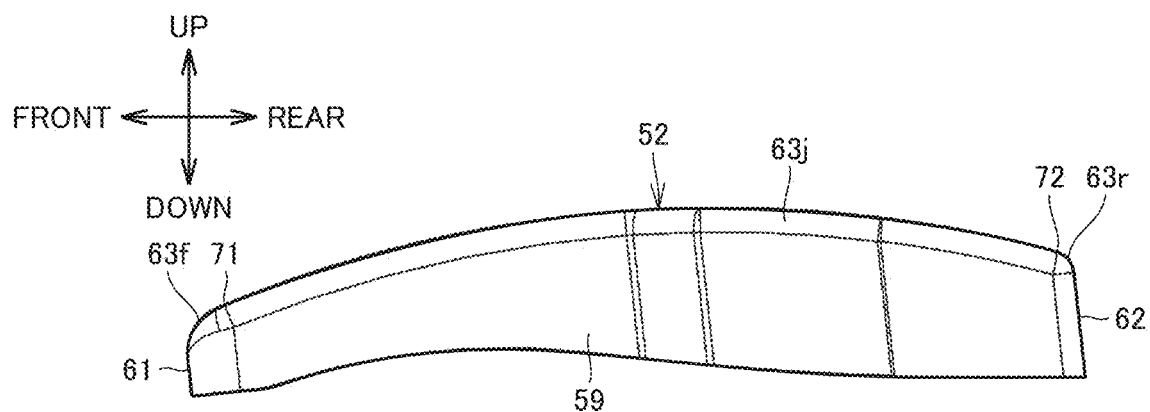
FIG. 12 is a left side view showing the armrest in a direction shown with an arrow XII in FIG. 9.
Figure 13:
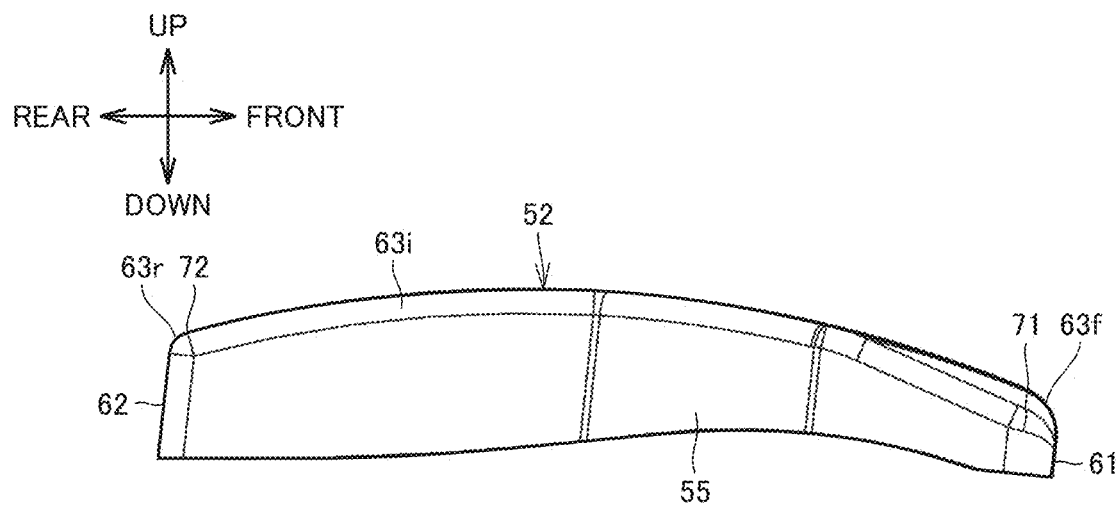
FIG. 13 is a right side view showing the armrest in a direction shown with an arrow XIII in FIG. 9.
Figure 14:
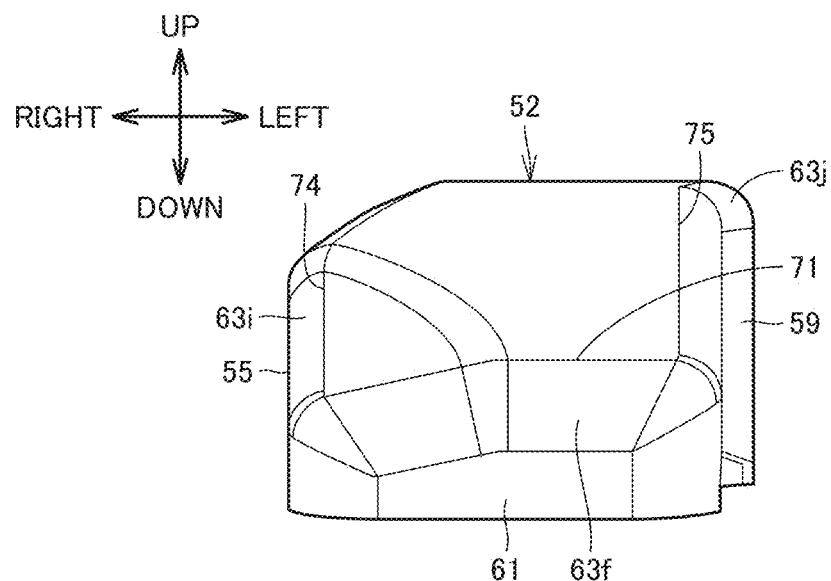
FIG. 14 is a front view showing the armrest in a direction shown with an arrow XIV in FIG. 9.
Figure 15:
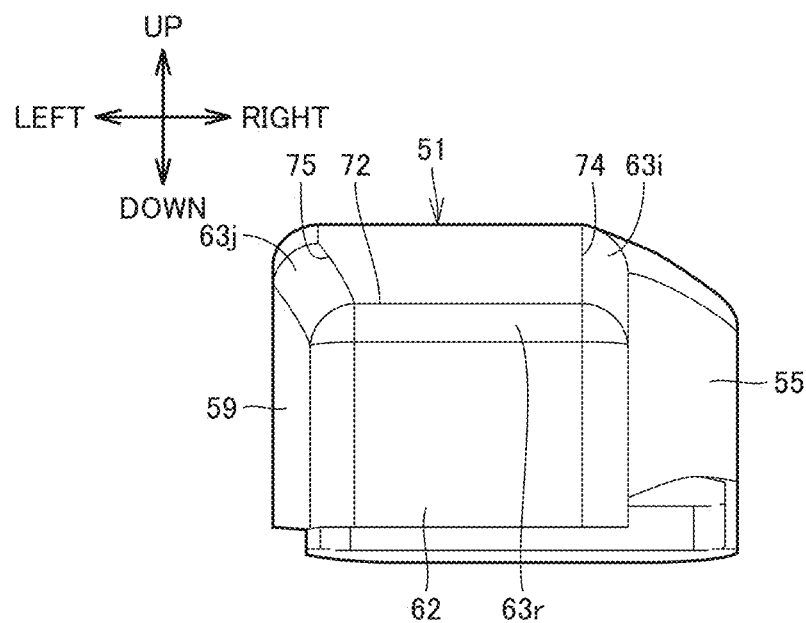
FIG. 15 is a rear view showing the armrest in a direction shown with an arrow XV in FIG. 9.

A specific shape of armrest 51 will be described in succession. FIGS. 9 and 10 are perspective views showing the armrest. FIG. 11 is a top view showing the armrest in a direction shown with an arrow XI in FIG. 9. FIG. 12 is a left side view showing the armrest in a direction shown with an arrow XII in FIG. 9. FIG. 13 is a right side view showing the armrest in a direction shown with an arrow XIII in FIG. 9. FIG. 14 is a front view showing the armrest in a direction shown with an arrow XIV in FIG. 9. FIG. 15 is a rear view showing the armrest in a direction shown with an arrow XV in FIG. 9.

Left armrest 51L and right armrest 51R are in a shape symmetrical to each other. FIGS. 9 to 15 show left armrest 51L and a shape of armrest 51 will be described below representatively with reference to left armrest 51L.

As shown in FIGS. 9 to 15, armrest 51 includes an upper surface 52. Upper surface 52 faces up. Upper surface 52 serves as an elbow support surface on which the elbow of the operator is placed. Upper surface 52 is generally in such an elongated shape that the fore/aft direction is defined as the longitudinal direction and the lateral direction is defined as the short-side direction.

Upper surface 52 includes a front end 71, a rear end 72, an inner side end 74, and an outer side end 75.

Front end 71 is located at a front end of upper surface 52. Rear end 72 is located at a rear end of upper surface 52. Inner side end 74 is located at a side end of upper surface 52 close to operator's seat 31 in the lateral direction. Outer side end 75 is located at a side end of upper surface 52 far from operator's seat 31 in the lateral direction. Upper surface 52 is provided over a range surrounded by front end 71, rear end 72, inner side end 74, and outer side end 75.

Armrest 51 further includes a front surface 61, a rear surface 62, an inside surface 55, and an outside surface 59.

Front surface 61 faces front. Front surface 61 two-dimensionally extends in the lateral direction. Front surface 61 is opposed to control lever 41 in the fore/aft direction. Rear surface 62 faces rearward. Rear surface 62 two-dimensionally extends in the lateral direction.

Inside surface 55 faces operator's seat 31 in the lateral direction. Inside surface 55 two-dimensionally extends in the fore/aft direction. Inside surface 55 has a front end and a rear end connected to front surface 61 and rear surface 62, respectively. Outside surface 59 faces a side opposite to operator's seat 31 in the lateral direction. Outside surface 59 two-dimensionally extends in the fore/aft direction. Outside surface 59 has a front end and a rear end connected to front surface 61 and rear surface 62, respectively.

Front surface 61, inside surface 55, rear surface 62, and outside surface 59 have upper ends connected to upper surface 52. Front surface 61 has the upper end connected to front end 71 of upper surface 52 with a beveled surface 63*f* being interposed. Inside surface 55 has the upper end connected to inner side end 74 of upper surface 52 with a beveled surface 63*i* being interposed. Rear surface 62 has the upper end connected to rear end 72 of upper surface 52 with a beveled surface 63*r* being interposed. Outside surface 59 has the upper end connected to outer side end 75 of upper surface 52 with a beveled surface 63*j* being interposed.

Beveled surface 63*f*, beveled surface 63*i*, beveled surface 63*r*, and beveled surface 63*j* are each formed from a curved surface. Beveled surface 63*f*, beveled surface 63*i*, beveled surface 63*r*, and beveled surface 63*j* may each be formed from a plane. A corner between upper surface 52, and front surface 61, inside surface 55, rear surface 62, and outside surface 59 does not have to be beveled as above.

(As to Forward Inclined Portion and Rearward Inclined Portion of Upper Surface)

Figure 16:
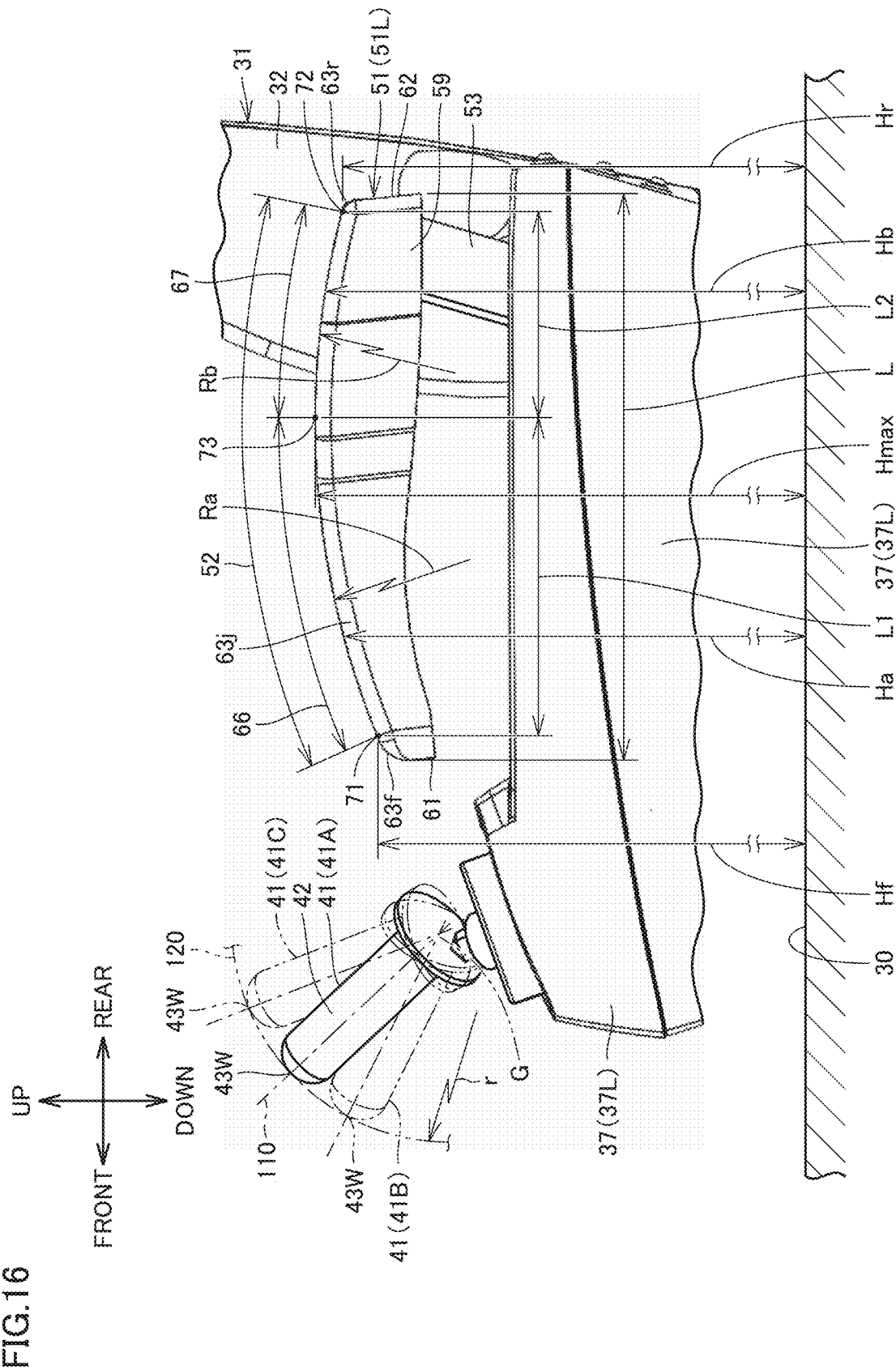
FIG. 16 is a left side view showing the control lever operated in the fore/aft direction and the armrest.

FIG. 16 is a left side view showing the control lever operated in the fore/aft direction and the armrest.

As shown in FIG. 16, upper surface 52 further includes a forward inclined portion 66 and a rearward inclined portion 67. Rearward inclined portion 67 is provided in the rear of forward inclined portion 66. Forward inclined portion 66 is located between control lever 41 and rearward inclined portion 67 in the fore/aft direction.

With floor surface 30 being defined as the reference, forward inclined portion 66 decreases in height Ha toward front end 71 of upper surface 52 in the fore/aft direction. With floor surface 30 being defined as the reference, rearward inclined portion 67 decreases in height Hb toward rear end 72 of upper surface 52 in the fore/aft direction.

Upper surface 52 further includes a top 73. With floor surface 30 being defined as the reference, a height Hmax of top 73 is highest of heights of upper surface 52 varying depending on positions in the fore/aft direction. In the top view, top 73 extends in the form of a line along the lateral direction. In the top view, top 73 extends straight in the lateral direction.

Forward inclined portion 66 is provided over a prescribed length rearward from front end 71 of upper surface 52. Rearward inclined portion 67 is provided over a prescribed length forward from rear end 72 of upper surface 52. Forward inclined portion 66 is provided as ranging from front end 71 of upper surface 52 to top 73 in the fore/aft direction. Rearward inclined portion 67 is provided as ranging from top 73 to rear end 72 of upper surface 52 in the fore/aft direction.

Top 73 is not limited to such a construction as extending straight in the lateral direction in the top view, and may be formed from a horizontal surface provided over a prescribed length in the fore/aft direction. In this case, forward inclined portion 66 and rearward inclined portion 67 are provided at a distance from each other in the fore/aft direction with top 73 being interposed.

A minimum height of forward inclined portion 66 with floor surface 30 being defined as the reference is lower than a minimum height of rearward inclined portion 67 with floor surface 30 being defined as the reference.

The minimum height of forward inclined portion 66 with floor surface 30 being defined as the reference corresponds to a height Hf of front end 71 with floor surface 30 being defined as the reference. A maximum height of forward inclined portion 66 with floor surface 30 being defined as the reference corresponds to height Hmax of top 73 with floor surface 30 being defined as the reference. A minimum height of rearward inclined portion 67 with floor surface 30 being defined as the reference corresponds to a height Hr of rear end 72 with floor surface 30 being defined as the reference. A maximum height of rearward inclined portion 67 with floor surface 30 being defined as the reference corresponds to height Hmax of top 73 with floor surface 30 being defined as the reference.

A length L1 of forward inclined portion 66 in the fore/aft direction (a length between front end 71 and top 73 in the fore/aft direction) is longer than a length L2 of rearward inclined portion 67 in the fore/aft direction (a length between top 73 and rear end 72 in the fore/aft direction) (L1>L2). Top 73 is located closer to rear end 72 than to front end 71 in the fore/aft direction.

Length L1 of forward inclined portion 66 in the fore/aft direction is at least half the entire length L of armrest 51 in the fore/aft direction. Length L2 of rearward inclined portion 67 in the fore/aft direction is shorter than half the entire length L of armrest 51 in the fore/aft direction.

The sum (L1+L2) of length L1 of forward inclined portion 66 in the fore/aft direction and length L2 of rearward inclined portion 67 in the fore/aft direction may be equal to or larger than 80% or 90% of the entire length L of armrest 51 in the fore/aft direction.

The minimum height of forward inclined portion 66 with floor surface 30 being defined as the reference may be equal to or longer than the minimum height of rearward inclined portion 67 with floor surface 30 being defined as the reference. Length L1 of forward inclined portion 66 in the fore/aft direction may be equal to or shorter than length L2 of rearward inclined portion 67 in the fore/aft direction (L1 L2). Top 73 may be located at a position intermediate between front end 71 and rear end 72 in the fore/aft direction or may be located closer to front end 71 than to rear end 72.

Forward inclined portion 66 is formed from a curved surface that extends in the fore/aft direction as being curved. When viewed in the lateral direction, forward inclined portion 66 extends in an arc shape between front end 71 and top 73.

Rearward inclined portion 67 is formed from a curved surface that extends in the fore/aft direction as being curved. When viewed in the lateral direction, rearward inclined portion 67 extends in an arc shape between top 73 and rear end 72.

The curved surface that forms forward inclined portion 66 has a curvature 1/Ra. The curved surface that forms rearward inclined portion 67 has a curvature 1/Rb equal to curvature 1/Ra (1/Ra=1/Rb). The curved surfaces that form forward inclined portion 66 and rearward inclined portion 67 have a constant curvature from front end 71 to rear end 72.

Curvature 1/Ra may be different in magnitude from curvature 1/Rb. In this case, curvature 1/Ra may be larger (1/Ra>1/Rb) or smaller (1/Ra<1/Rb) than curvature 1/Rb. Forward inclined portion 66 may be formed from a plurality of curved surfaces that are different in curvature from each other and aligned in the fore/aft direction. Rearward inclined portion 67 may be formed from a plurality of curved surfaces that are different in curvature from each other and aligned in the fore/aft direction.

At least one of forward inclined portion 66 and rearward inclined portion 67 may be formed from a plane. Forward inclined portion 66 may include at least one curved surface and at least one plane. Rearward inclined portion 67 may include at least one curved surface and at least one plane.

The height of the front position (41B) with floor surface 30 being defined as the reference is lower than the height of the neutral position (41A) with floor surface 30 being defined as the reference. The height of the neutral position (41A) with floor surface 30 being defined as the reference is lower than the height of the rear position (41C) with floor surface 30 being defined as the reference.

Control lever 41 is provided as being tiltable with a rotation center G being defined as the center. Grip 42 includes a tip end 43W. Tip end 43W is a tip end part of grip 42 when control lever 41 is laterally viewed. When control lever 41 is laterally viewed, tip end 43W corresponds to an end of grip 42 located opposite to rotation center G of control lever 41. When control lever 41 is laterally viewed, tip end 43W and rotation center G are located on central axis 110.

While control lever 41 is tilted among the front position (41B), the neutral position (41A), and the rear position (41C), tip end 43W of grip 42 when viewed laterally moves as drawing a trace 120 in an arc shape. In this case, curvature 1/Ra of the curved surface that forms forward inclined portion 66 is smaller than a curvature 1/r of trace 120 in the arc shape (1/Ra<1/r), and curvature 1/Rb of the curved surface that forms rearward inclined portion 67 is smaller than curvature 1/r of trace 120 in the arc shape (1/Rb<1/r).

Curvature 1/Ra of the curved surface that forms forward inclined portion 66 may be equal to or larger than curvature 1/r of trace 120 in the arc shape (1/Ra 1/r) and curvature 1/Rb of the curved surface that forms rearward inclined portion 67 may be equal to or larger than curvature 1/r of trace 120 in the arc shape (1/Rb 1/r).

Figure 17:
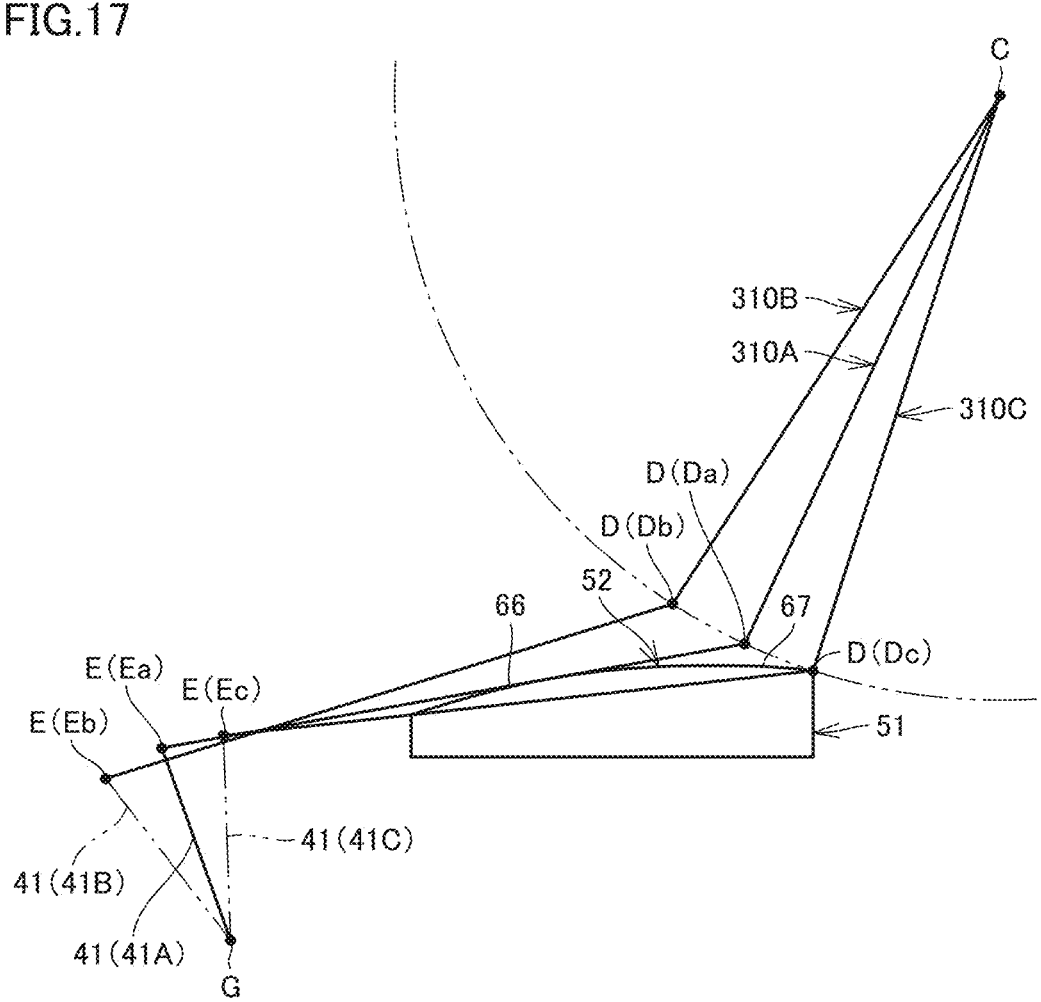
FIG. 17 is a left side view schematically showing movement of an arm of an operator who operates the control lever in the fore/aft direction.

FIG. 17 is a left side view schematically showing movement of an arm of an operator who operates the control lever in the fore/aft direction.

As shown in FIGS. 5, 16, and 17, in a general operation posture, the operator operates control lever 41 while the operator holds grip 42 in his/her palm with his/her forearm being placed on upper surface 52 of armrest 51.

The operator's arm (upper arm) extends forward and diagonally downward from a shoulder joint C and bent at an elbow D (Da, db, or Dc). The operator's arm (forearm) extends forward and diagonally downward from elbow D (Da, db, or Dc) at an inclination closer to horizontal than an inclination between shoulder joint C and elbow D (Da, db, or Dc). On an extension in which the operator's arm (forearm) extends diagonally downward from elbow D (Da, db, or Dc), the operator holds grip 42 of control lever 41 in his/her palm E (Ea, Eb, or Ec).

FIG. 17 shows the operator's arm when control lever 41 is positioned at the neutral position (41A) with a line 310A, the operator's arm when control lever 41 is positioned at the front position (41B) with a line 310B, and the operator's arm when control lever 41 is positioned at the rear position (41C) with a line 310C.

When the operator tilts control lever 41 in the fore/aft direction between the neutral position (41A), and the front position (41B) and the rear position (41C), the operator moves a position of his/her palm E in which grip 42 is held in the fore/aft direction while the operator maintains shoulder joint C at a fixed position.

In this case, the position of the operator's elbow D moves in an arc shape around shoulder joint C and the position and the inclination of the operator's arm (forearm) are varied on upper surface 52 of armrest 51. In operator's cab 14, upper surface 52 of armrest 51 is in a shape in consideration of movement of the operator's arm (forearm) in operating control lever 41 in the fore/aft direction so as to smoothen the operation onto control lever 41 by the operator.

More specifically, when the operator tilts control lever 41 forward from the neutral position (41A) toward the front position (41B), the position of elbow D moves forward and diagonally upward along the arc, and the operator's forearm is inclined diagonally downward while the forearm moves forward.

In operator's cab 14, upper surface 52 of armrest 51 includes forward inclined portion 66. With floor surface 30 being defined as the reference, forward inclined portion 66 decreases in height Ha toward front end 71 of upper surface 52 in the fore/aft direction. According to such a construction, forward inclined portion 66 is in a shape conforming to movement of the operator's forearm in tilting control lever 41 forward from the neutral position (41A) toward the front position (41B). Therefore, the forearm of the operator who operates control lever 41 is less likely to interfere with upper surface 52.

When the operator tilts control lever 41 rearward from the neutral position (41A) toward the rear position (41C), the position of elbow D moves rearward and diagonally downward in an arc shape.

In operator's cab 14, upper surface 52 of armrest 51 includes rearward inclined portion 67. With floor surface 30 being defined as the reference, rearward inclined portion 67 decreases in height Hb toward rear end 72 of upper surface 52 in the fore/aft direction. According to such a construction, rearward inclined portion 67 is in a shape conforming to movement of the operator's elbow in tilting control lever 41 rearward from the neutral position (41A) toward the rear position (41C). Therefore, the forearm of the operator who operates control lever 41 is less likely to interfere with upper surface 52.

For such reasons, the operator can smoothly operate control lever 41 between the neutral position (41A), and the front position (41B) and the rear position (41C).

In operator's cab 14, forward inclined portion 66 is provided as ranging from front end 71 of upper surface 52 to top 73 in the fore/aft direction, and rearward inclined portion 67 is provided as ranging from top 73 to rear end 72 of upper surface 72 in the fore/aft direction. According to such a construction, upper surface 52 forms such a projecting shape as projecting upward between front end 71 and rear end 72. Therefore, the shape of upper surface 52 can further conform to movement of the operator's arm in tilting control lever 41 in the fore/aft direction between the neutral position (41A), and the front position (41B) and the rear position (41C). Consequently, the operator can more smoothly operate control lever 41.

When the operator attempts to change the inclination of the arm or displace the position of the arm in the fore/aft direction while the operator places his/her arm on upper surface 52 in operating control lever 41, movement of the arm may be interfered by excessive friction resistance between top 73 and the operator's arm or by the operator's arm being caught at top 73. In operator's cab 14, in the top view, top 73 extends straight in the lateral direction. Since the operator's arm is thus supported at top 73 of upper surface 52 within a straight range along the lateral direction, the operator can readily change the inclination of his/her arm or displace the position of the arm in the fore/aft direction.

Forward inclined portion 66 and rearward inclined portion 67 are each formed from the curved surface that extends in the fore/aft direction as being curved. Since the operator's arm is thus supported within the straight range along the lateral direction also at forward inclined portion 66 and rearward inclined portion 67 on upper surface 52, the operator can more readily change the inclination of his/her arm or displace the position of the arm in the fore/aft direction.

The curved surfaces that form forward inclined portion 66 and rearward inclined portion 67 have a curvature constant between front end 71 of upper surface 52 and rear end 72 of upper surface 52. The operator can thus evenly obtain an effect of facilitated change in inclination of the arm or displacement of the position of the arm in the fore/aft direction regardless of the position of upper surface 52 on which the operator's arm is placed.

Figure 18:
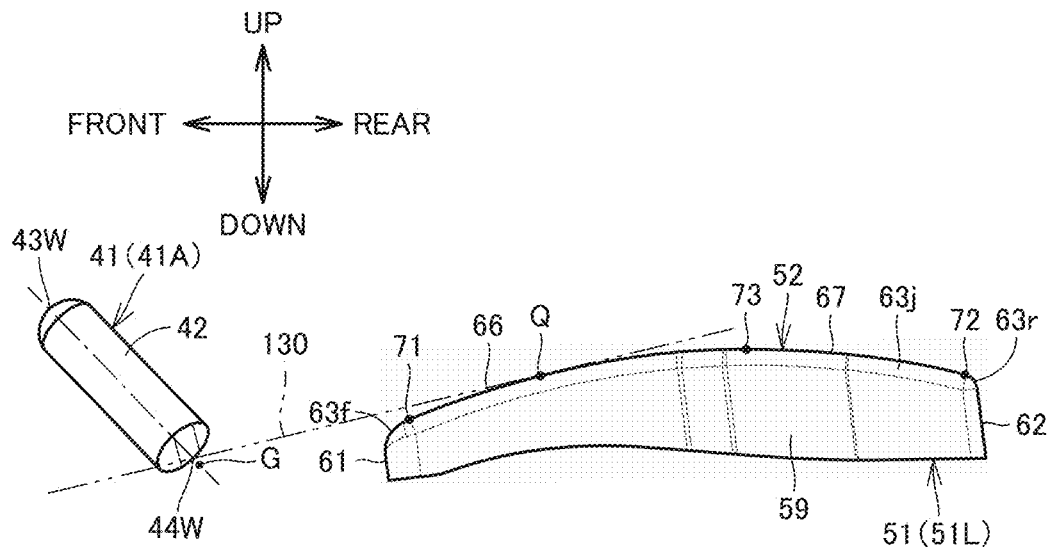
FIG. 18 is a left side view showing the control lever positioned at a neutral position and the armrest.

FIG. 18 is a left side view showing the control lever positioned at the neutral position and the armrest.

As shown in FIG. 18, grip 42 further includes a root 44W. Root 44W is a root part of grip 42 when control lever 41 is laterally viewed. When control lever 41 is laterally viewed, root 44W corresponds to an end of grip 42 located on the side of rotation center G of control lever 41. When control lever 41 is laterally viewed, root 44W is located on central axis 110.

A virtual straight line 130 that extends rearward from root 44W of control lever 41 at the time when control lever 41 is positioned at the neutral position (41A) and is in contact with forward inclined portion 66 is assumed. Virtual straight line 130 corresponds to a tangential line in contact at a contact Q with forward inclined portion 66 extending in an arc shape. Front end 71 of upper surface 52 is located below virtual straight line 130.

According to such a construction, when control lever 41 is positioned at the neutral position (41A), the upper arm of the operator who holds grip 42 can be regarded as being arranged above virtual straight line 130 extending from root 44W of control lever 41 toward contact Q. In this case, front end 71 of upper surface 52 is located below virtual straight line 130. Therefore, the operator's arm placed on upper surface 52 is readily arranged at a position distant above from front end 71 of upper surface 52. Thus, when control lever 41 is tilted from the neutral position (41A) toward the front position (41B) or the rear position (41C), the operator's arm is less likely to be caught at front end 71 of upper surface 52.

Figure 19:
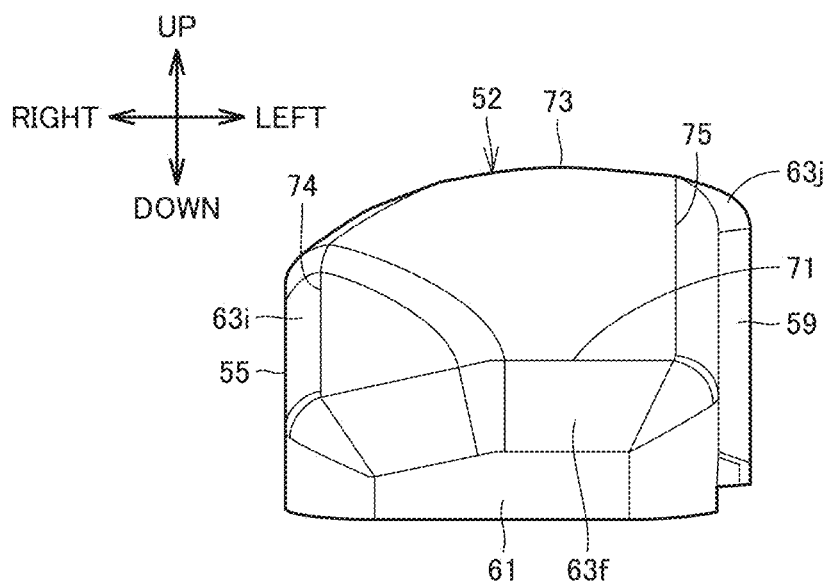
FIG. 19 is a front view showing a modification of a shape of a top of an upper surface.

FIG. 19 is a front view showing a modification of the shape of the top of the upper surface. FIG. 19 corresponds to FIG. 14.

As shown in FIG. 19, in the present modification, in the front view, top 73 is curved downward in the lateral direction. In the front view, top 73 extends laterally as being curved. In the front view, top 73 is in a shape of an arc that projects upward. Upper surface 52 is smoothly contiguous between top 73 and positions around top 73.

According to such a construction, the operator can readily laterally move the arm placed on upper surface 52. Therefore, the operator can smoothly operate control lever 41 also between the neutral position (41A), and the inner position (41D) and the outer position (41E) (see FIG. 7).

(As to Front Portion of Upper Surface)

As shown in FIGS. 4 and 7, upper surface 52 further includes a front portion 52F and a rear portion 52R. Front portion 52F is provided over a prescribed length rearward from front end 71. Rear portion 52R is provided over a prescribed length forward from rear end 72.

A width B1 of front portion 52F of upper surface 52 is larger than a width of rear portion 52R of upper surface 52 (B1>B2). A lateral length is herein referred to as a width.

Front portion 52F of upper surface 52 projects toward operator's seat 31 in the lateral direction, relative to rear portion 52R of upper surface 52. A lateral length from a centerline 101 of operator's seat 31 that extends in the fore/aft direction to inner side end 74 in front portion 52F of upper surface 52 is shorter than a lateral length from centerline 101 of operator's seat 31 that extends in the fore/aft direction to inner side end 74 in rear portion 52R of upper surface 52.

In tilting control lever 41 in the lateral direction between the neutral position (41A), and the inner position (41D) and the outer position (41E), the operator laterally moves the position of the palm in which grip 42 is held while the operator maintains the position of the elbow fixed on upper surface 52. In this case, the position of the operator's forearm (wrist) sways in the lateral direction on upper surface 52.

In operator's cab 14, width B1 of front portion 52F of upper surface 52 is larger than a width B2 of rear portion 52R of upper surface 52. According to such a construction, even when the operator's forearm sways in the lateral direction as the operator operates control lever 41, the operator's forearm (in particular, the wrist) can continually be supported on front portion 52F of upper surface 52.

Figure 20:
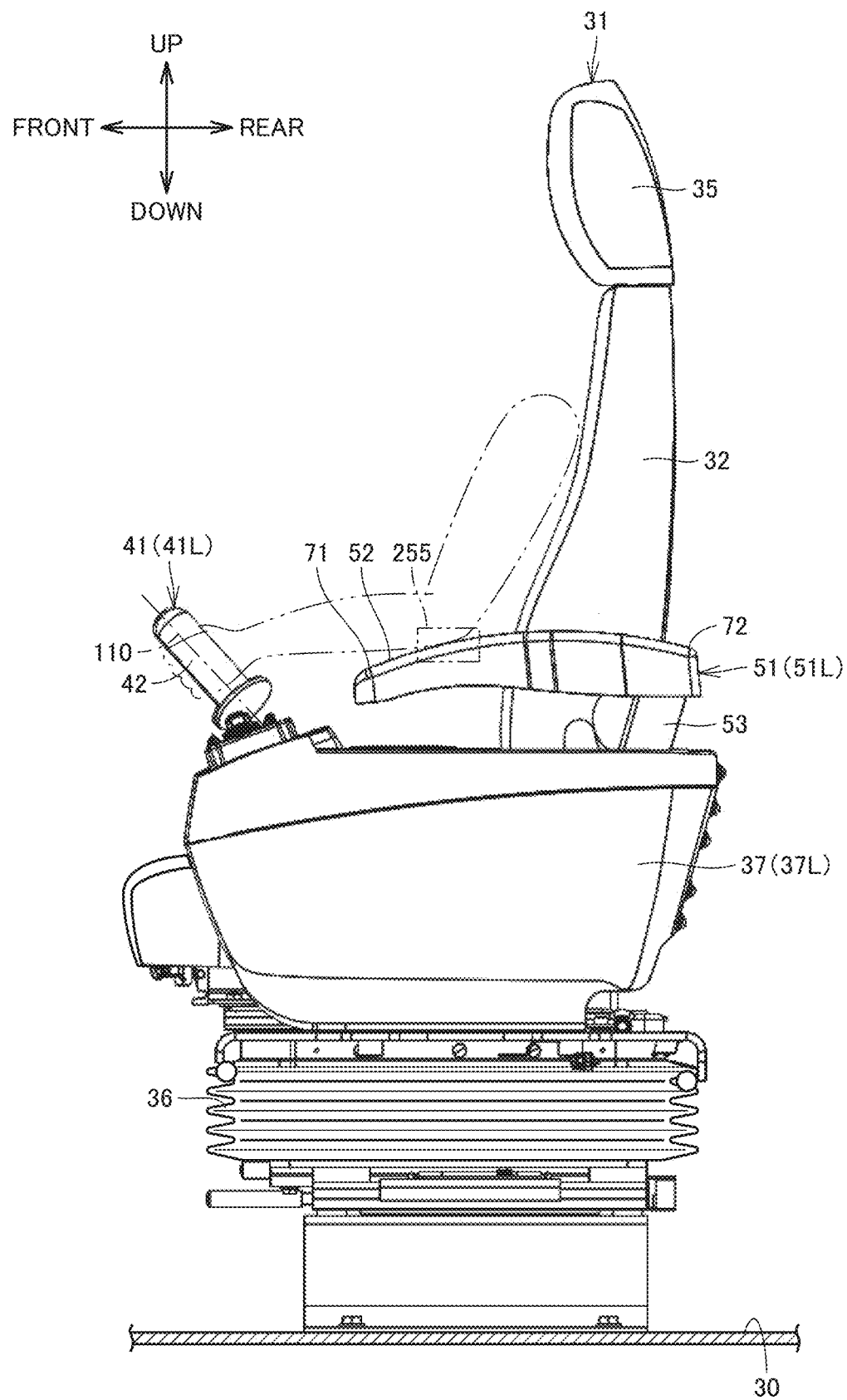
FIG. 20 is another left side view showing the structure around the operator's seat in the operator's cab in FIG. 1.
Figure 21:
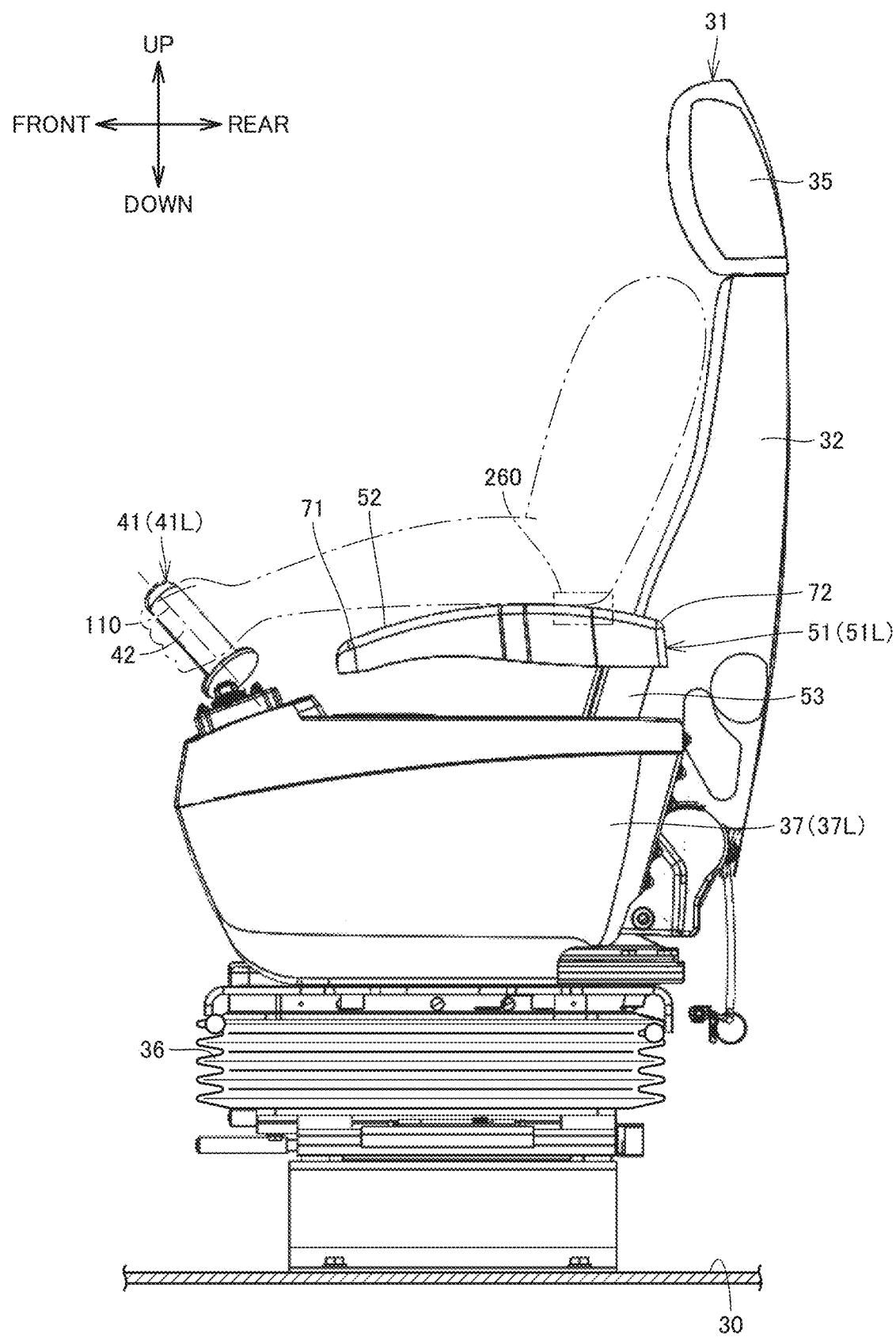
FIG. 21 is yet another left side view showing the structure around the operator's seat in the operator's cab in FIG. 1.

FIGS. 20 and 21 are left side views showing the structure around the operator's seat in the operator's cab in FIG. 1. As shown in FIGS. 5, 20, and 21, operator's seat 31 is provided as being slidable in the fore/aft direction. Operator's seat 31 is provided as being slidable in the fore/aft direction independently of console 37, control lever 41, and armrest 51.

As operator's seat 31 is slid in the fore/aft direction, the operator's seat is positioned at any position among a front-end position shown in FIG. 20, the intermediate position shown in FIG. 5, and a rear-end position shown in FIG. 21. According to such a construction, the position of operator's seat 31 in the fore/aft direction can be adjusted in conformity with the operator's physical build.

FIG. 20 shows an arm of an operator of slight build, FIG. 5 shows an arm of an operator of medium build, and FIG. 21 shows an arm of an operator of large build.

In general, as the physical build is slighter, a length of the operator's arm is shorter. Therefore, when control lever 41 is operated, a position 250 (see FIG. 5) where the elbow of the operator of medium build is placed on armrest 51 is shifted forward relative to a position 260 (see FIG. 21) where the elbow of the operator of large build is placed on armrest 51. A position 255 (see FIG. 20) where the elbow of the operator of slight build is placed on armrest 51 is shifted forward relative to position 250 (see FIG. 5) where the elbow of the operator of medium build is placed on armrest 51.

Figure 22:
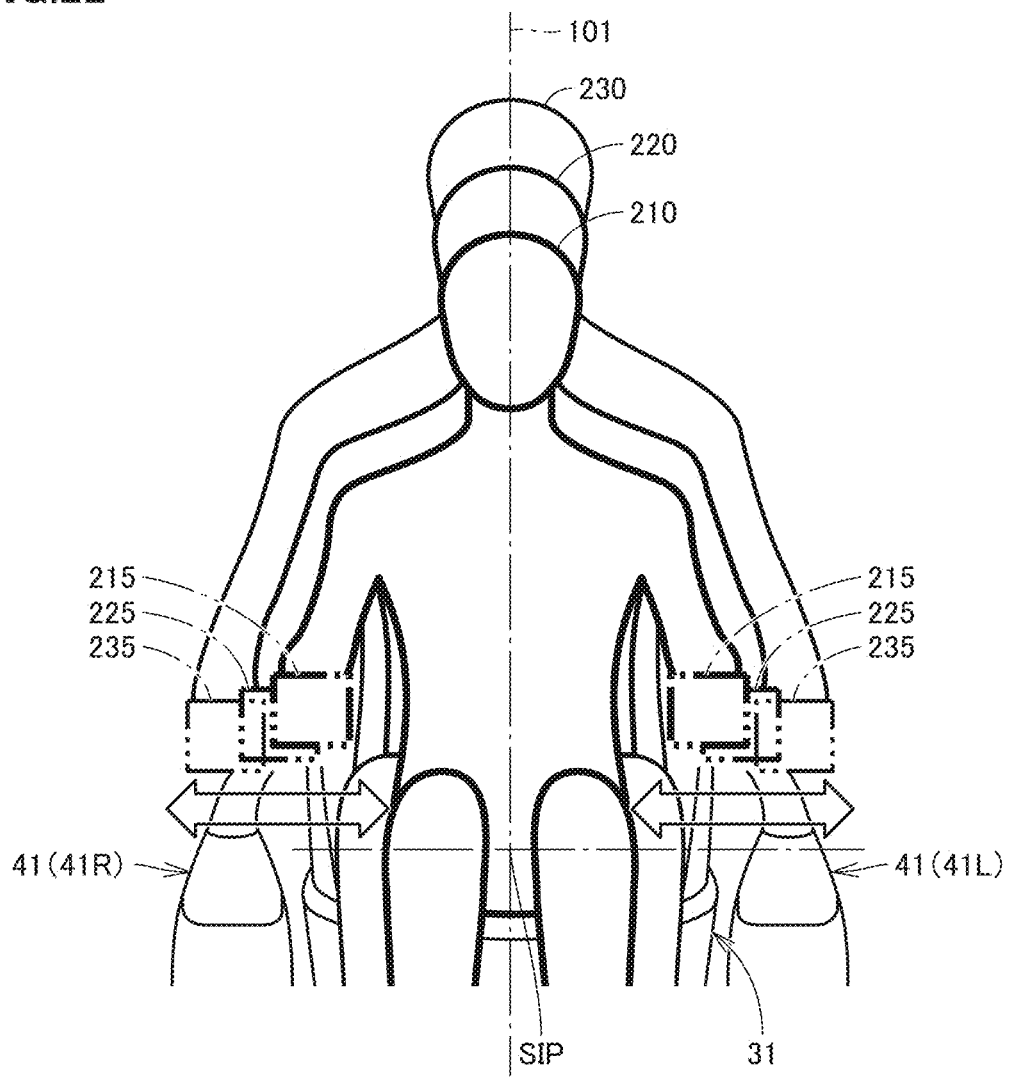
FIG. 22 is a front view showing a state that operators different in physical build are seated.

FIG. 22 is a front view showing a state that operators different in physical build are seated. In FIG. 22, a case in which an operator 230 of large build sits in operator's seat 31, a case in which an operator 220 of medium build sits in operator's seat 31, and a case in which an operator 210 of slight build sits in operator's seat 31 are compared with one another.

As shown in FIG. 22, in general, as the physical build is slighter, a shoulder width of the operator is smaller. Therefore, when control lever 41 is operated, a position 225 where the elbow of operator 220 of medium build is placed on armrest 51 is shifted inward along the lateral direction relative to a position 235 where the elbow of operator 230 of large build is placed on armrest 51. A position 215 where the elbow of operator 210 of slight build is placed on armrest 51 is shifted inward along the lateral direction relative to position 225 where the elbow of operator 220 of medium build is placed on armrest 51.

As shown in FIG. 4, in hydraulic excavator 100, front portion 52F of upper surface 52 projects toward operator's seat 31 in the lateral direction relative to rear portion 52R of upper surface 52. According to such a construction, when the operator of slight build sits in operator's seat 31, the elbow of the operator can be supported at front portion 52F of upper surface 52, and when the operator of large build sits in operator's seat 31, the elbow of the operator can be supported at rear portion 52R of upper surface 52. The operator can thus smoothly operate control lever 41 regardless of his/her physical build, with his/her elbow being placed on armrest 51.

Since front portion 52F of upper surface 52 projects toward operator's seat 31 in the lateral direction relative to rear portion 52R of upper surface 52, armrest 51 can be in such a form that a rear portion 52R side thereof retracts in a direction away from operator's seat 31 in the lateral direction, relative to a front portion 52F side. Thus, when the operator of particularly large build sits in operator's seat 31, a wide space is secured between the lower back of the operator and armrest 51, and hence compression of the operator's lower back by armrest 51 can be suppressed.

Figure 23:
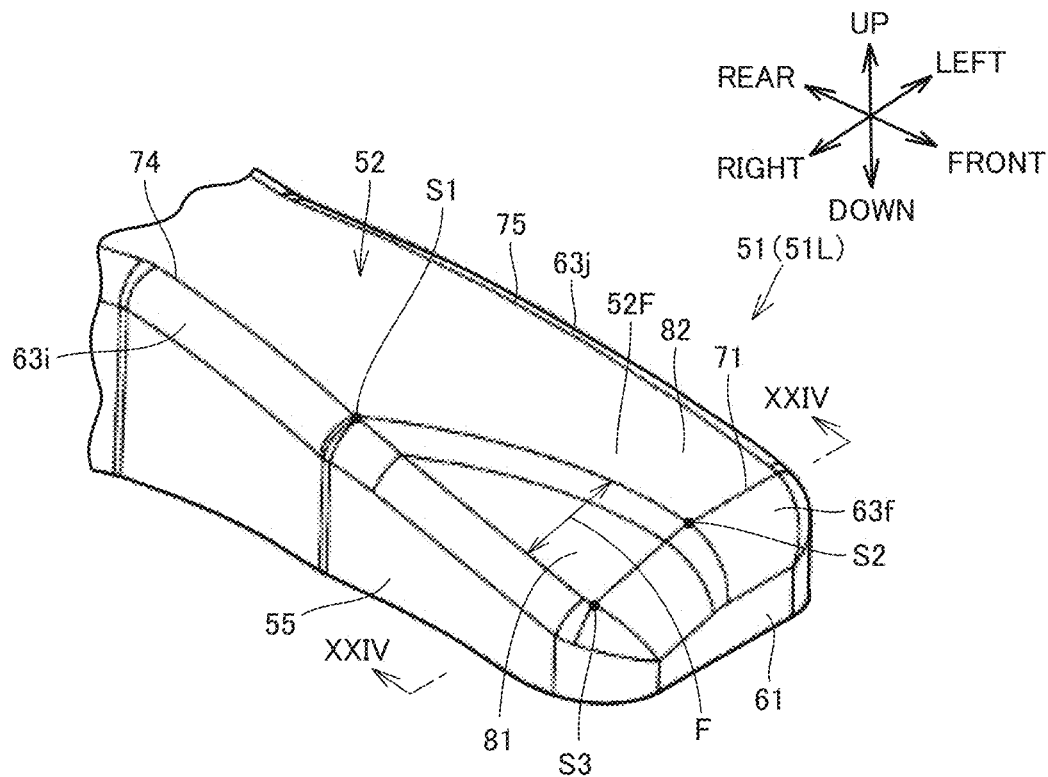
FIG. 23 is a perspective view showing the armrest within a range surrounded by a chain double-dotted line XXIII in FIG. 10.
Figure 24:
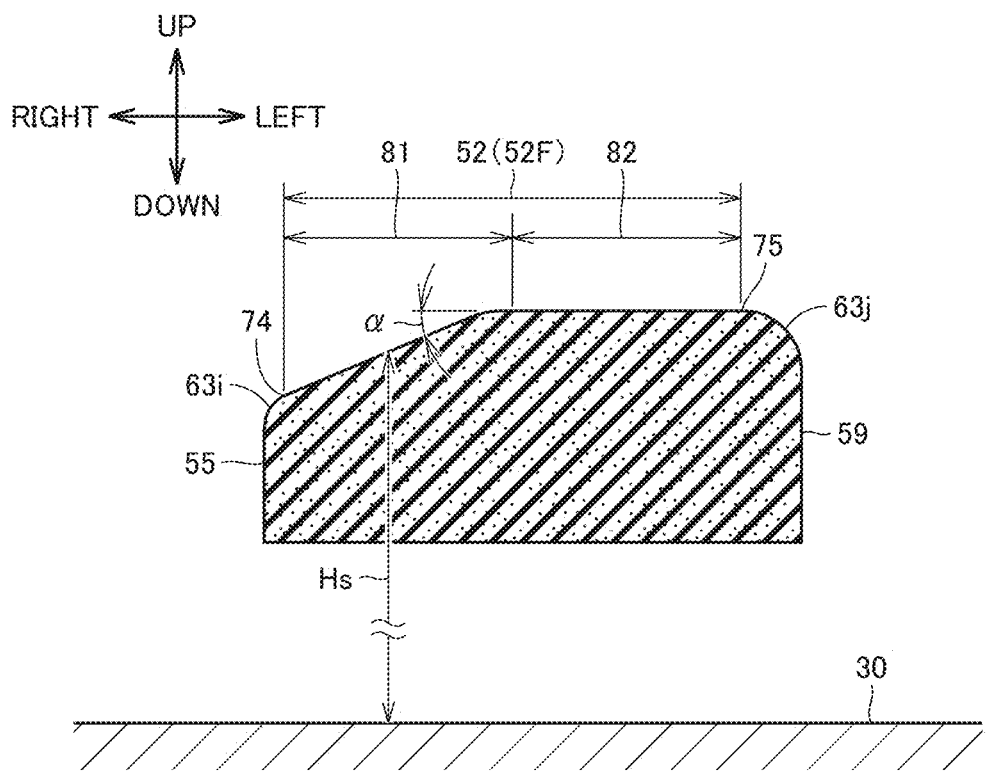
FIG. 24 is a cross-sectional view showing the armrest in a direction shown with an arrow XXIV-XXIV in FIG. 23.

FIG. 23 is a perspective view showing the armrest within a range surrounded by a chain double-dotted line XXIII in FIG. 10. FIG. 24 is a cross-sectional view showing the armrest in a direction shown with an arrow XXIV-XXIV in FIG. 23.

As shown in FIGS. 4, 23, and 24, front portion 52F of upper surface 52 includes an inclined portion 81. With floor surface 30 being defined as the reference, a height Hs of inclined portion 81 decreases toward operator's seat 31. With floor surface 30 being defined as the reference, height Hs of inclined portion 81 decreases toward operator's seat 31 in the lateral direction.

Inclined portion 81 is provided at a corner of front end 71 and inner side end 74 of upper surface 52. Inclined portion 81 is provided in front of top 73 (see FIG. 16). Inclined portion 81 is a part of forward inclined portion 66 (see FIG. 16). Inclined portion 81 is provided at a position distant from outer side end 75 of upper surface 52 inward along the lateral direction.

Inclined portion 81 corresponds to a range surrounded by three sides that connect a point S1, a point S2, and a point S3 in FIG. 23 to one another. Point S1 is located on inner side end 74 at a distance rearward from front end 71. Point S2 is located on front end 71, between inner side end 74 and outer side end 75 in the lateral direction. Point S2 may be located closer to outer side end 75 than to inner side end 74 in the lateral direction, located at a position intermediate between inner side end 74 and outer side end 75, or closer to inner side end 74 than to outer side end 75. Point S3 is located at an intersection between inner side end 74 and front end 71. A length between point S1 and point S3 is longer than a length between point S3 and point S2. The length between point S1 and point S3 may be equal to or shorter than the length between point S3 and point S2.

A width F of inclined portion 81 increases toward front end 71 of upper surface 52 in the fore/aft direction.

With floor surface 30 being defined as the reference, height Hs of inclined portion 81 decreases from a side where point S1 and point S2 are connected to each other toward operator's seat 31 in the lateral direction. With floor surface 30 being defined as the reference, height Hs of inclined portion 81 decreases forward from the side where point S1 and point S2 are connected to each other. With floor surface 30 being defined as the reference, height Hs of inclined portion 81 is highest at point S1 and lowest at point S3.

Front portion 52F of upper surface 52 further includes a horizontal portion 82. Horizontal portion 82 and inclined portion 81 are provided as being aligned in the lateral direction. Horizontal portion 82 is provided opposite to operator's seat 31, with inclined portion 81 lying therebetween, in the lateral direction. Horizontal portion 82 is connected to inclined portion 81 (the side where point S1 and point S2 are connected to each other).

In a cross-section shown in FIG. 24 of armrest 51 cut at a plane orthogonal to the fore/aft direction, horizontal portion 82 extends horizontally in the lateral direction. Horizontal portion 82 is connected to inclined portion 81 at one end that extends horizontally in the lateral direction. Inclined portion 81 forms an angle $\alpha$ with respect to the horizontal which is extension of horizontal portion 82. Angle $\alpha$ is within a range of $0°<\alpha<90°$. Angle $\alpha$ may be within a range of $5°\leq\alpha\leq30°$.

Figure 25:
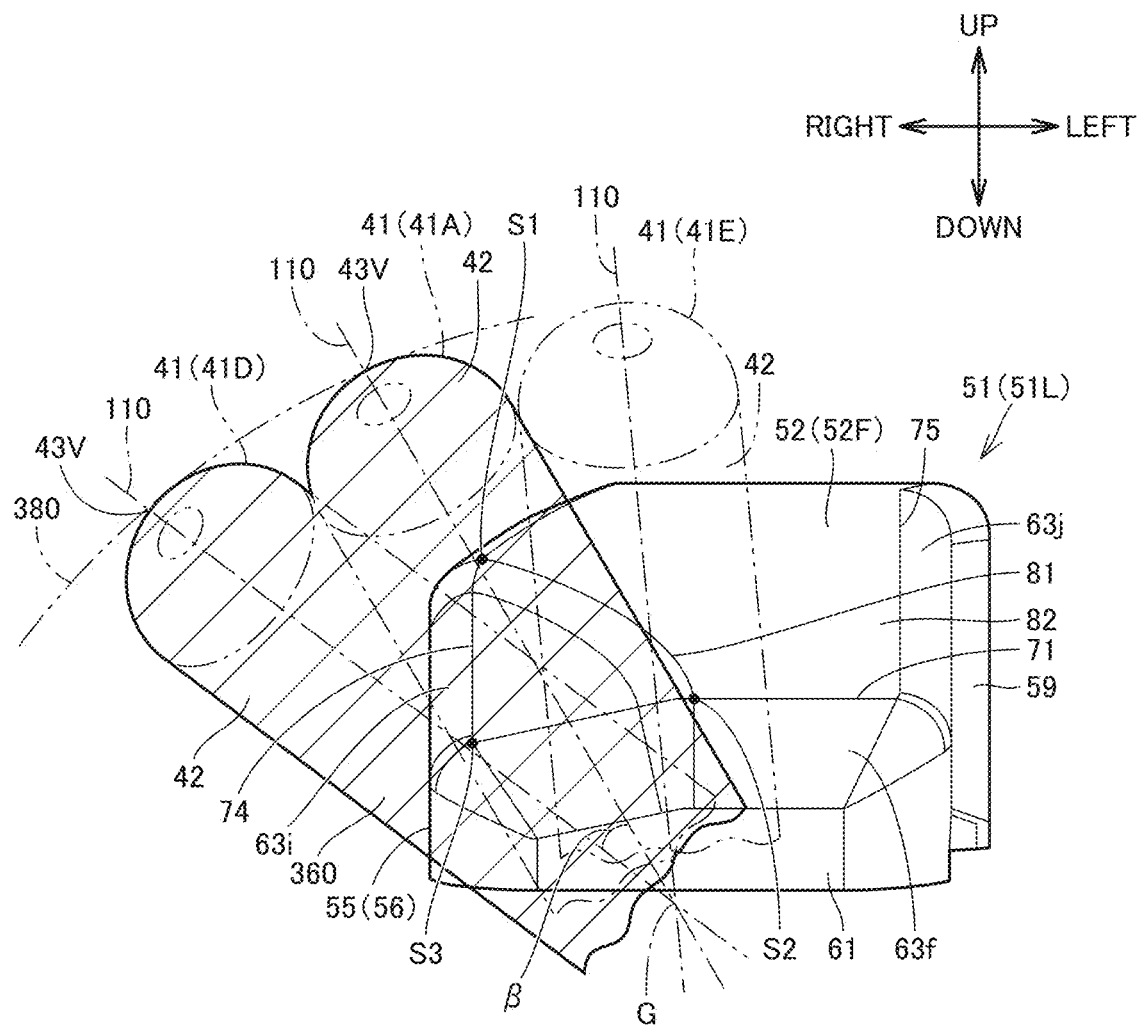
FIG. 25 is a front view showing the control lever operated in the lateral direction and the armrest.

FIG. 25 is a front view showing the control lever operated in the lateral direction and the armrest.

As shown in FIGS. 23 to 25, a height of the inner position (41D) with floor surface 30 being defined as the reference is lower than a height of the neutral position (41A) with floor surface 30 being defined as the reference. The height of the neutral position (41A) with floor surface 30 being defined as the reference is lower than a height of the outer position (41E) with floor surface 30 being defined as the reference.

When viewed in the fore/aft direction, an operation region (a hatched region 360 in FIG. 25) of control lever 41 between the neutral position (41A) and the inner position (41D) overlaps with inclined portion 81. Control lever 41 positioned at the neutral position (41A) is aligned with horizontal portion 82 in the lateral direction.

When viewed in the fore/aft direction, front end 71 of upper surface 52 overlaps with control lever 41 positioned at the outer position (41E) in a range where front end 71 is contiguous to horizontal portion 82. Control lever 41 positioned at the neutral position (41A) and the inner position (41D) overlaps with front end 71 in a range where front end 71 is contiguous to inclined portion 81.

The operator holds grip 42 in his/her (left) palm from a side opposite to operator's seat 31 in the lateral direction, and tilts control lever 41 in the lateral direction between the neutral position (41A), and the inner position (41D) and the outer position (41E). At this time, the position of the operator's wrist varies on upper surface 52 of armrest 51. In operator's cab 14, upper surface 52 of armrest 51 is in a shape in consideration of movement of the operator's wrist when the operator operates control lever 41 in the lateral direction so as to smoothen the operation by the operator onto control lever 41.

More specifically, when the operator tilts control lever 41 inward in the lateral direction from the neutral position (41A) toward the inner position (41D), the operator's wrist moves inward along the lateral direction and diagonally downward.

In operator's cab 14, front portion 52F of upper surface 52 includes inclined portion 81. With floor surface 30 being defined as the reference, height Hs of inclined portion 81 decreases toward operator's seat 31 in the lateral direction. According to such a construction, inclined portion 81 is in a shape in conformity with movement of the operator's wrist in tilting control lever 41 inward in the lateral direction from the neutral position (41A) toward the inner position (41D), and hence the forearm of the operator who operates control lever 41 is less likely to interfere with upper surface 52. The operator can thus smoothly operate control lever 41 between the neutral position (41A) and the inner position (41D).

When viewed in the fore/aft direction, the operation region of control lever 41 between the neutral position (41A) and the inner position (41D) overlaps with inclined portion 81. According to such a construction, in tilting control lever 41 from the neutral position (41A) toward the inner position (41D), the operator's wrist can more reliably pass over inclined portion 81, and hence the forearm of the operator who operates control lever 41 is further less likely to interfere with upper surface 52.

When the operator tilts control lever 41 outward in the lateral direction from the neutral position (41A) toward the outer position (41E), the operator's wrist moves outward along the lateral direction and diagonally upward.

In operator's cab 14, front portion 52F of upper surface 52 further includes horizontal portion 82. Horizontal portion 82 is provided opposite to operator's seat 31, with inclined portion 81 lying therebetween, in the lateral direction.

In such a construction, as the operator's wrist passes over horizontal portion 82 while the operator's wrist moves outward along the lateral direction and diagonally upward, the operator's wrist can be prevented from interfering with upper surface 52. The operator can thus smoothly operate control lever 41 between the neutral position (41A) and the outer position (41E). The operator can place his/her wrist on horizontal portion 82 while control lever 41 is positioned at the neutral position (41A) and while the operator tilts control lever 41 between the neutral position (41A), and the front position (41B) and the rear position (41C). Fatigue of the operator who operates control lever 41 can thus effectively be lessened.

Width F of inclined portion 81 increases toward front end 71 of upper surface 52 in the fore/aft direction. According to such a construction, when the operator tilts control lever 41 in the lateral direction between the neutral position (41A), and the inner position (41D) and the outer position (41E), magnitude of displacement of the operator's upper arm in the lateral direction is larger on a side closer to the wrist and smaller on a side closer to the elbow. Therefore, width F of inclined portion 81 can be in conformity with movement of the operator's upper arm. Interference of the operator's wrist with upper surface 52 can thus more reliably be prevented.

As shown in FIGS. 24 and 25, β represents an angle of tilt of control lever 41 between the neutral position (41A) and the inner position (41D). Angle α formed by inclined portion 81 with respect to the horizontal which is extension of horizontal portion 82 is equal to angle β of tilt of control lever 41.

Control lever 41 (grip 42) includes a tip end 43V. Tip end 43V refers to a tip end part of control lever 41 (grip 42) when control lever 41 is viewed in the fore/aft direction. When control lever 41 is viewed in the fore/aft direction, tip end 43V is an end of control lever 41 (grip 42) located opposite to rotation center G of control lever 41. When control lever 41 is viewed in the fore/aft direction, tip end 43V is located on central axis 110.

When control lever 41 is tilted between the neutral position (41A) and the inner position (41D), tip end 43V of control lever 41 when viewed in the fore/aft direction moves as drawing a trace 380 in an arc shape. In this case, in a cross-section of armrest 51 cut at the plane orthogonal to the fore/aft direction, inclined portion 81 may be identical in shape to trace 380 in the arc shape drawn by tip end 43V of control lever 41.

In such a case, the shape of inclined portion 81 can be in better conformity with movement of the operator's wrist when control lever 41 is operated from the neutral position (41A) to the inner position (41D). The operator can thus more smoothly operate control lever 41.

Angle α formed by inclined portion 81 with respect to the horizontal which is extension of horizontal portion 82 may be smaller or larger than angle β of tilt of control lever 41.

[Summary of Construction and Effect of Operator's Cab and Hydraulic Excavator]

Operator's cab 14 includes operator's seat 31, control lever 41 as the operation portion, and armrest 51. Operator's seat 31 is provided on floor surface 30. Control lever 41 is provided laterally to operator's seat 31. Control lever 41 is operated at least toward operator's seat 31. Armrest 51 includes upper surface 52. Armrest 51 is provided laterally to operator's seat 31 in the rear of control lever 41. Front portion 52F of upper surface 52 is larger in width than rear portion 52R of upper surface 52. Front portion 52F of upper surface 52 includes inclined portion 81. With floor surface 30 being defined as the reference, inclined portion 81 decreases in height toward operator's seat 31.

According to such a construction, front portion 52F of upper surface 52 is larger in width than rear portion 52R of upper surface 52. Therefore, the operator's arm displaced inward along the lateral direction as control lever 41 is operated can continually be supported on front portion 52F of upper surface 52. By providing in front portion 52F of upper surface 52, inclined portion 81 in conformity with movement of the operator's arm when control lever 41 is operated toward operator's seat 31, the arm of the operator who operates control lever 41 is less likely to interfere with upper surface 52. For these reasons, the operator can smoothly operate control lever 41.

Front portion 52F of upper surface 52 projects toward operator's seat 31 relative to rear portion 52R of upper surface 52.

According to such a construction, an operator of slight build can operate control lever 41 with his/her elbow being placed on front portion 52F of upper surface 52, and an operator of large build can operate control lever 41 with his/her elbow being placed on rear portion 52R of upper surface 52. Therefore, the operator can smoothly operate control lever 41 regardless of his/her physical build.

Control lever 41 can be tilted at least between the neutral position (41A) as the first position and the inner position (41D) as the second position shifted toward operator's seat 31 from the neutral position (41A). The height of the inner position (41D) with floor surface 30 being defined as the reference is lower than the height of the neutral position (41A) with floor surface 30 being defined as the reference. When viewed in the fore/aft direction, the operation region of control lever 41 between the neutral position (41A) and the front position (41D) overlaps with inclined portion 81.

According to such a construction, as the operator operates control lever 41 from the neutral position (41A) to the inner position (41D), the operator's arm (wrist) moves inward along the lateral direction and diagonally downward. At this time, as the operator's arm (wrist) passes over inclined portion 81, the operator's arm is less likely to interfere with upper surface 52. The operator can thus smoothly operate control lever 41 between the neutral position (41A) and the inner position (41D).

Control lever 41 can be tilted further between the neutral position (41A) and the outer position (41E) as the third position shifted from the neutral position (41A) in the direction away from operator's seat 31. The height of the outer position (41E) with floor surface 30 being defined as the reference is higher than the height of the neutral position (41A) with floor surface 30 being defined as the reference. Front portion 52F of upper surface 52 further includes horizontal portion 82. Horizontal portion 82 is provided opposite to operator's seat 31 with inclined portion 81 lying therebetween in the lateral direction. Horizontal portion 82 is connected to inclined portion 81.

According to such a construction, as the operator operates control lever 41 from the neutral position (41A) to the outer position (41E), the operator's arm (wrist) moves outward along the lateral direction and diagonally upward. As the operator's arm (wrist) passes over horizontal portion 82, the operator's arm can be prevented from interfering with upper surface 52. The operator can thus smoothly operate control lever 41 between the neutral position (41A) and the outer position (41E).

In the cross-section of armrest 51 cut at the plane orthogonal to the fore/aft direction, inclined portion 81 forms angle α (0°<α<90°) with respect to the horizontal which is extension of horizontal portion 82. Angle α is equal to angle β of tilt of control lever 41 between the neutral position (41A) and the inner position (41D).

When control lever 41 is operated between the neutral position (41A) and the inner position (41D), tip end 43V of control lever 41 when viewed in the fore/aft direction moves as drawing trace 380 in the arc shape. In the cross-section of armrest 51 cut at the plane orthogonal to the fore/aft direction, inclined portion 81 may be identical in shape to trace 380 in the arc shape drawn by tip end 43V of control lever 41.

According to such a construction, the shape of inclined portion 81 can be in better conformity with movement of the operator's arm when the operator operates control lever 41 from the neutral position (41A) to the inner position (41D). Since the arm of the operator who operates control lever 41 is further less likely to interfere with upper surface 52, the operator can smoothly operate control lever 41 between the neutral position (41A) and the inner portion (41D).

Width F of inclined portion 81 increases toward front end 71 of upper surface 52 in the fore/aft direction.

According to such a construction, when the operator operates control lever 41 inward along the lateral direction, magnitude of displacement of the operator's arm in the lateral direction is larger on the side closer to the wrist and smaller on the side closer to the elbow. Therefore, the width of inclined portion 81 can be in conformity with movement of the operator's upper arm. Since the operator's arm is further less likely to interfere with upper surface 52, the operator can smoothly operate control lever 41.

Hydraulic excavator 100 as the work vehicle includes operator's cab 14 and work implement 12. Work implement 12 is controlled by using control lever 41.

According to such a construction, the operator can smoothly operate control lever 41 in controlling work implement 12.

The present disclosure is applied to an operator's cab of various work vehicles that include an armrest as a support for the operator's elbow, without being limited to the operator's cab of the hydraulic excavator.

It should be understood that the embodiment disclosed herein is illustrative and non-restrictive in every respect. The scope of the present invention is defined by the terms of the claims rather than the description above and is intended to include any modifications within the scope and meaning equivalent to the terms of the claims.

REFERENCE SIGNS LIST 11 vehicular main body; 12 work implement; 13 revolving unit; 14 operator's cab; 15 traveling apparatus; 15Cr crawler belt; 15M travel motor; 16 boom; 17 arm; 18 bucket; 19 engine hood; 20A, 20B boom cylinder; 21 arm cylinder; 22 bucket cylinder; 23 boom pin; 24 arm pin; 25 bucket pin; 26 revolution center; 30 floor surface; 31 operator's seat; 32 seat back; 33 seat cushion; 35 headrest; 36 suspension mechanism; 37, 37L, 37R console; 41, 41L, 41R control lever; 42 grip; 43V, 43W tip end; 44W root; 51, 51L, 51R armrest; 52 upper surface; 52F front portion; 52R rear portion; 53 armrest support; 55 inside surface; 59 outside surface; 61 front surface; 62 rear surface; 63f, 63i, 63j, 63r beveled surface; 66 forward inclined portion; 67 rearward inclined portion; 71 front end; 72 rear end; 73 top; 74 inner side end; 75 outer side end; 81 inclined portion; 82 horizontal portion; 100 hydraulic excavator; 101 centerline; 110 central axis; 120, 380 trace; 130 virtual straight line; 210, 220, 230 operator; 215, 225, 235, 250, 255, 260 position; 310A, 310B, 310C line; 360 hatched region

The invention claimed is:

1. An operator's cab comprising:
an operator's seat provided on a floor surface;
an operation portion provided laterally to the operator's seat, the operation portion being operated at least toward the operator's seat; and
an armrest including an upper surface, the armrest being provided laterally to the operator's seat in rear of the operation portion, wherein
a front portion of the upper surface is larger in width than a rear portion of the upper surface,
the front portion of the upper surface includes an inclined portion,
with the floor surface being defined as a reference, the inclined portion decreases in height toward the operator's seat,
the front portion of the upper surface further includes a horizontal portion provided opposite to the operator's seat with the inclined portion lying between the horizontal portion and the operator's seat in a lateral direction and connected to the inclined portion, and
in a cross-section of the armrest cut at a plane orthogonal to a fore/aft direction, the inclined portion forms an angle α ($5° \leq \alpha \leq 30°$) with respect to a horizontal which is extension of the horizontal portion.

2. The operator's cab according to claim 1 comprising the armrest, wherein
the front portion of the upper surface projects toward the operator's seat relative to the rear portion of the upper surface.

3. The operator's cab according to claim 1, wherein
the operation portion is a control lever that can be tilted at least between a first position and a second position shifted toward the operator's seat from the first position,
a height of the second position with the floor surface being defined as the reference is lower than a height of the first position with the floor surface being defined as the reference, and
when viewed in the fore/aft direction, an operation region of the control lever between the first position and the second position overlaps with the inclined portion.

4. The operator's cab according to claim 3 comprising the armrest, wherein
the control lever is further tiltable between the first position and a third position shifted in a direction away from the operator's seat from the first position, and
a height of the third position with the floor surface being defined as the reference is higher than the height of the first position with the floor surface being defined as the reference.

5. The operator's cab according to claim 3, wherein the angle α is equal to an angle β of tilt of the control lever between the first position and the second position.

6. The operator's cab according to claim 3, wherein
while the control lever is operated between the first position and the second position, a tip end of the control lever when viewed in the fore/aft direction moves as drawing a trace in an arc shape, and
in a cross-section of the armrest cut at a plane orthogonal to the fore/aft direction, the inclined portion is identical in shape to the trace in the arc shape.

7. The operator's cab according to claim 1 comprising the armrest, wherein
the inclined portion has a width increasing toward a front end of the upper surface in the fore/aft direction.

8. A work vehicle comprising:
the operator's cab according to claim 1; and
a work implement controlled by using the operation portion.

* * * * *